United States Patent [19]
Tew

[11] Patent Number: 5,820,189
[45] Date of Patent: Oct. 13, 1998

[54] VEHICLE/TENT CAMPING SYSTEM

[76] Inventor: R. Burton Tew, 3883 Market St., West Valley City, Utah 84119

[21] Appl. No.: 639,434

[22] Filed: Apr. 29, 1996

Related U.S. Application Data

[63] Continuation of Ser. No. 192,149, Feb. 4, 1994, abandoned.

[51] Int. Cl.⁶ ........................................ B60P 3/345
[52] U.S. Cl. ............................ 296/26; 296/157; 296/164
[58] Field of Search ............................. 296/26, 163, 165, 296/167, 176, 117, 57.1, 213, 152; 135/88.01, 88.05, 88.07, 88.08, 88.13, 88.14, 88.15, 88.16; 160/DIG. 18

[56] References Cited

U.S. PATENT DOCUMENTS

| | | | |
|---|---|---|---|
| 1,533,820 | 4/1925 | Whitehead | 135/117 |
| 2,116,313 | 5/1938 | Lundberg | 296/213 |
| 2,815,762 | 12/1957 | Smith | 135/88.14 |
| 3,259,422 | 7/1966 | Canon | 296/23 |
| 3,390,913 | 7/1968 | Hunter | 296/10 |
| 3,774,957 | 11/1973 | Basaraba | 296/23 |
| 3,968,809 | 7/1976 | Beavers | 296/26 X |
| 4,065,166 | 12/1977 | Shoemaker | 296/26 X |
| 4,294,484 | 10/1981 | Robertson | 296/156 |
| 4,504,049 | 3/1985 | Straub | 296/26 X |
| 4,523,657 | 6/1985 | Kooyamjian | 180/68.1 |
| 4,544,195 | 10/1985 | Gunn | 296/26 |
| 4,566,729 | 1/1986 | Magnino | 296/159 |
| 4,652,040 | 3/1987 | Mahan | 296/159 |
| 4,657,299 | 4/1987 | Mahan | 296/159 |
| 4,763,945 | 8/1988 | Murray | 296/57.1 |
| 4,858,986 | 8/1989 | Whitley et al. | 296/163 X |
| 4,867,502 | 9/1989 | Sylvester | 296/161 |
| 5,188,415 | 2/1993 | Wagner | 296/57.1 |
| 5,358,298 | 10/1994 | Fate | 296/167 X |

FOREIGN PATENT DOCUMENTS

| | | | |
|---|---|---|---|
| 2409883 | 7/1979 | France | 296/165 |
| 2-248585 | 10/1990 | Japan | 135/88.13 |

OTHER PUBLICATIONS

Gander Mountain ad. Camper Top Tent Gander Mountain, Inc. Camping Gear & Clothing 1993 p. 15.

Primary Examiner—David M. Mitchell

[57] ABSTRACT

An "I" tent door configuration (60) is described with pull ties (120). A system for adapting and attaching a tailgate tent (22) to a vehicle (20) having various rear opening (173) configurations is described. This system includes attachment to vehicle (20) appendages: hatch (32), rear rain gutter (31) and tailgate (30), and adaptation devices for a vehicle (20) not equipped with said appendages. This system also includes embodiments of a support sleeve which holds lift support (278) open. A rain/sun fly (25) is described for use with an independent canopy (322) and/or rear panel (49) of tailgate tent (22). Finally, magnetically hemmed side window screens (24) are described.

15 Claims, 14 Drawing Sheets

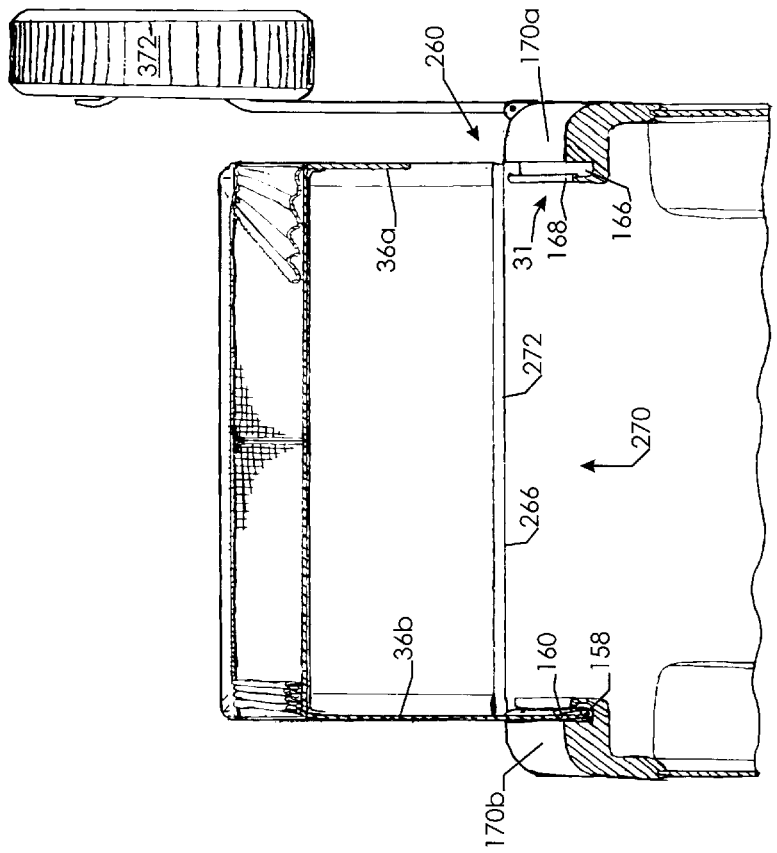
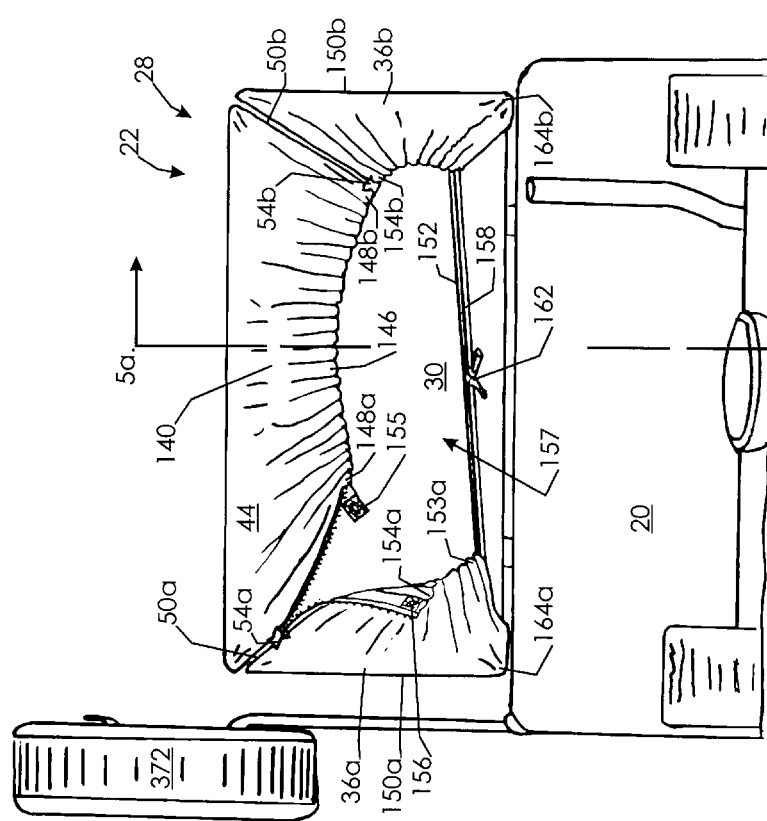

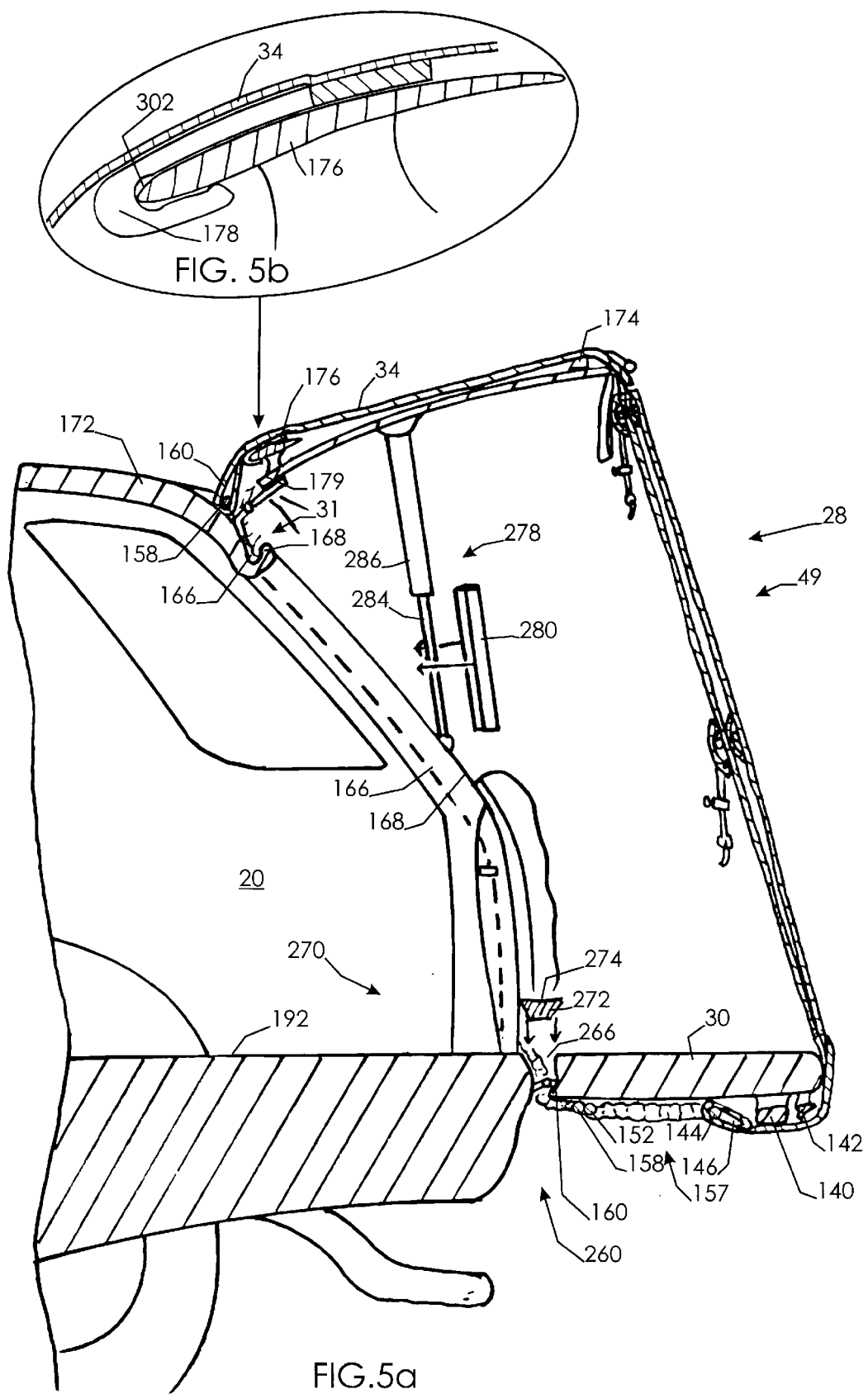

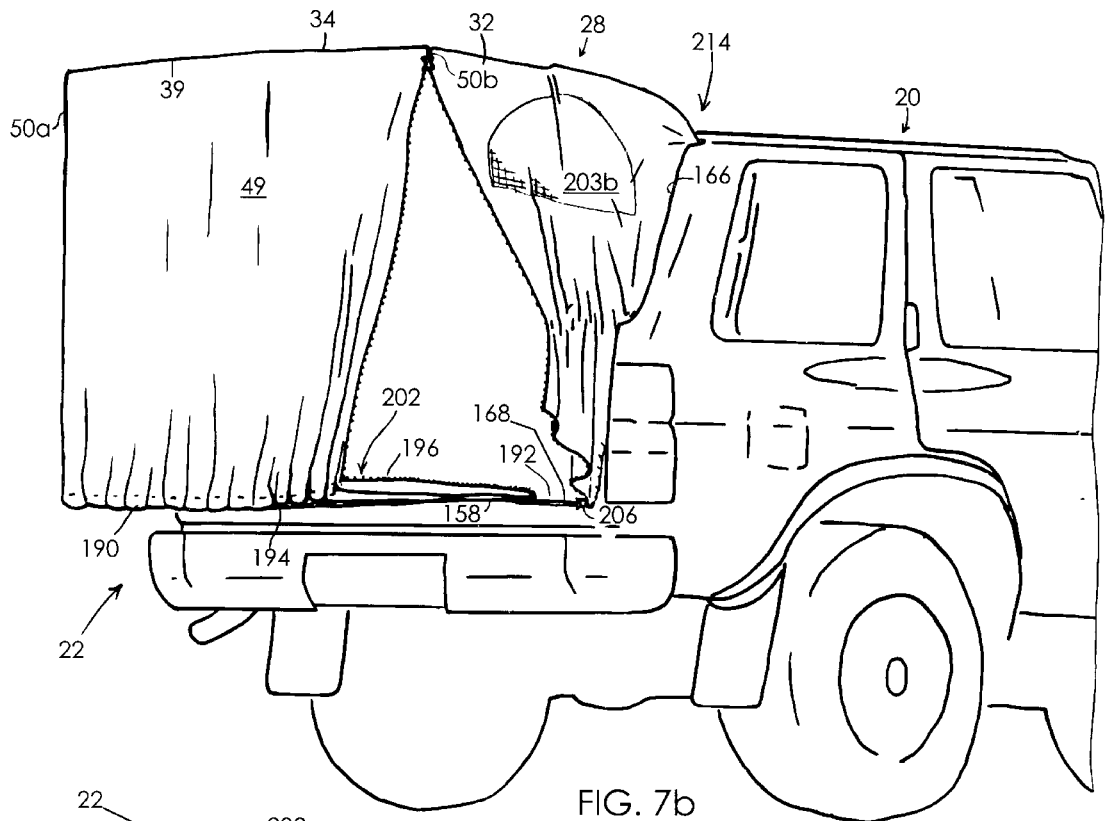
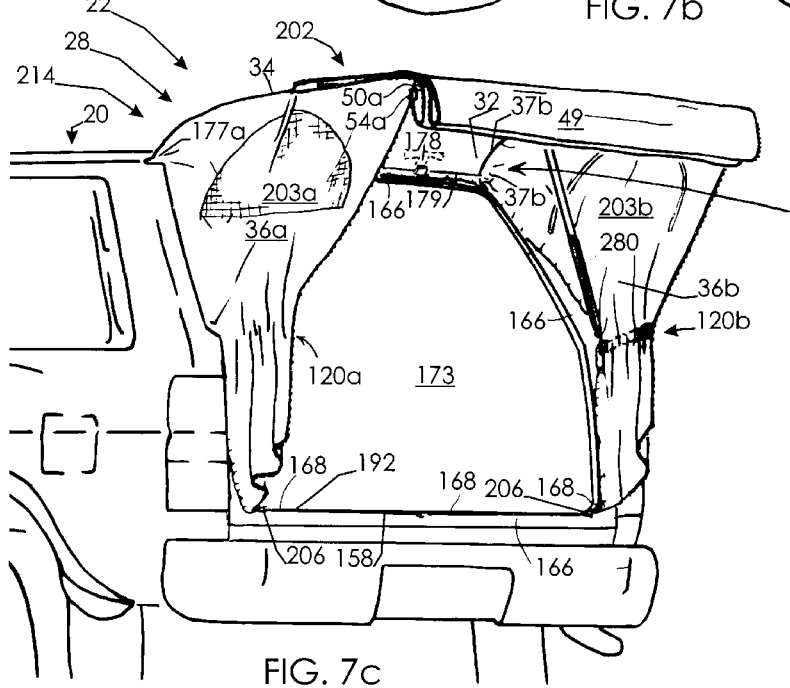
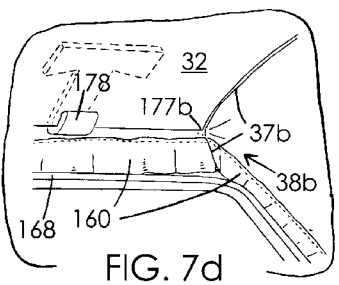
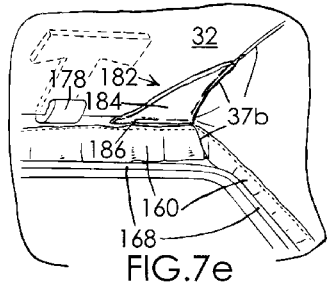
FIG. 7b
FIG. 7c
FIG. 7d
FIG. 7e

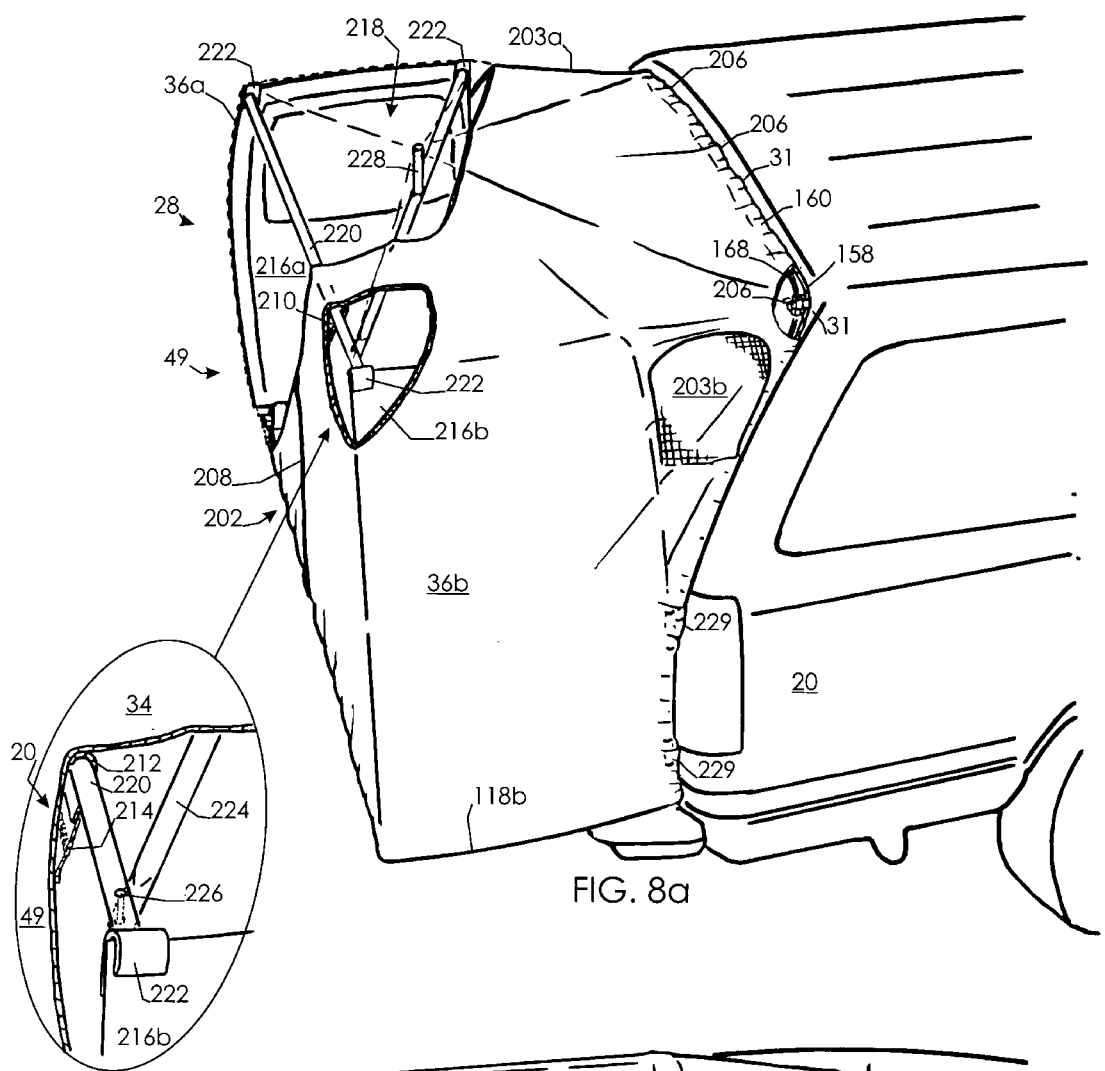
FIG. 8a
FIG. 8b
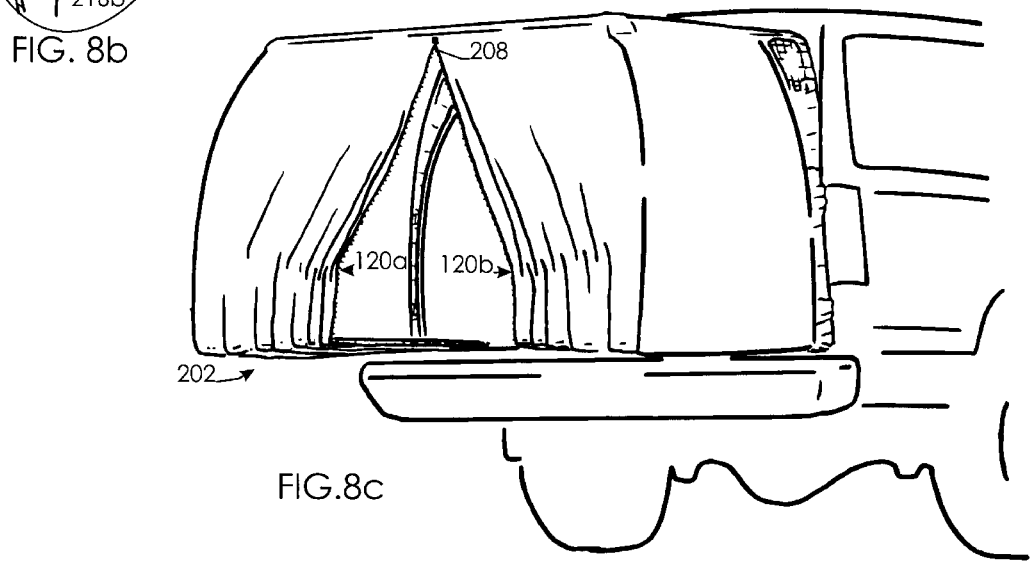
FIG. 8c

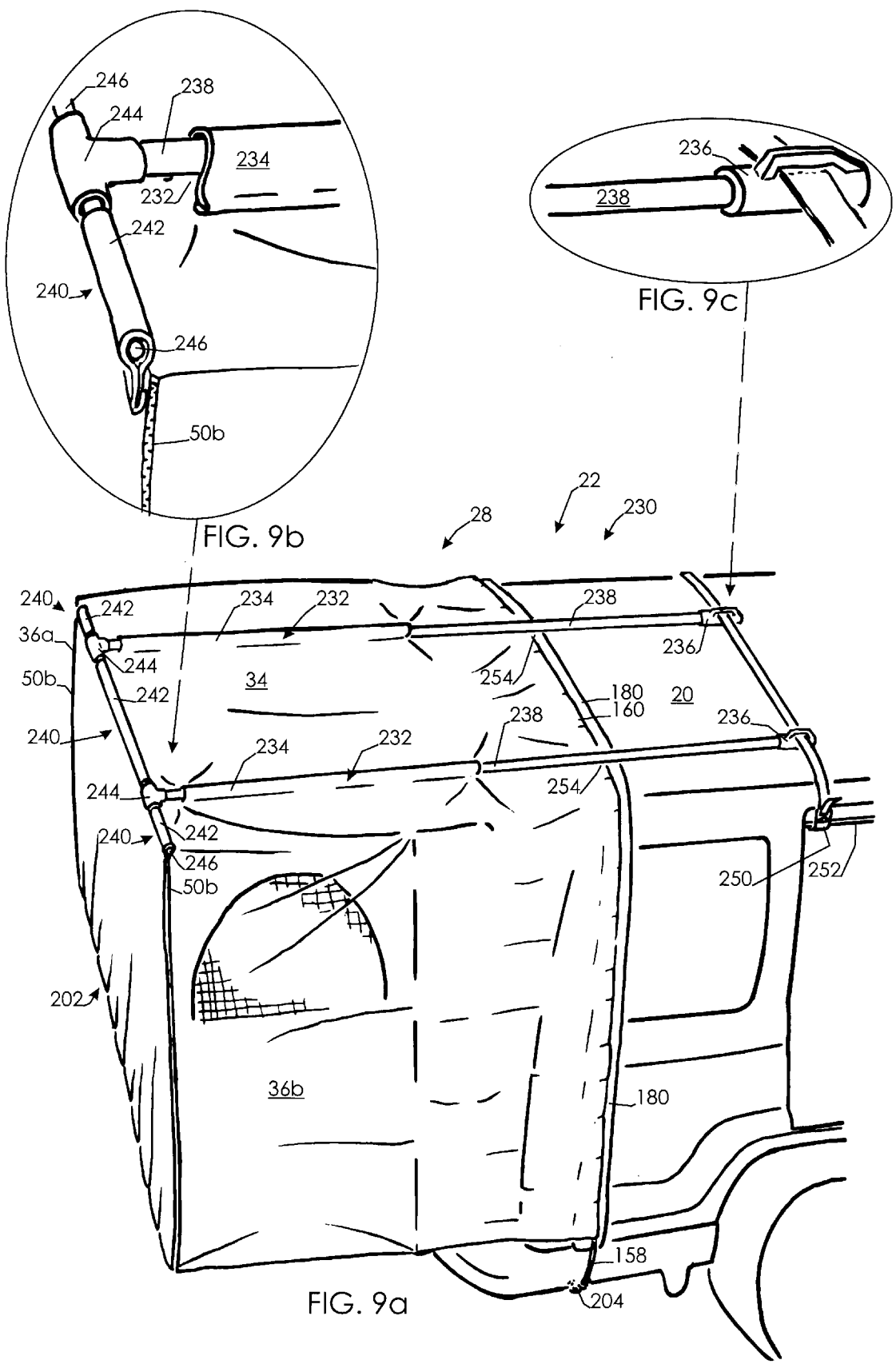

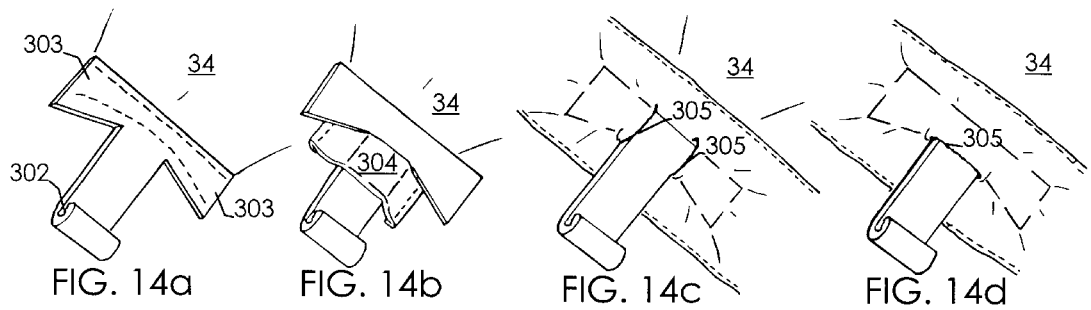
FIG. 14a   FIG. 14b   FIG. 14c   FIG. 14d
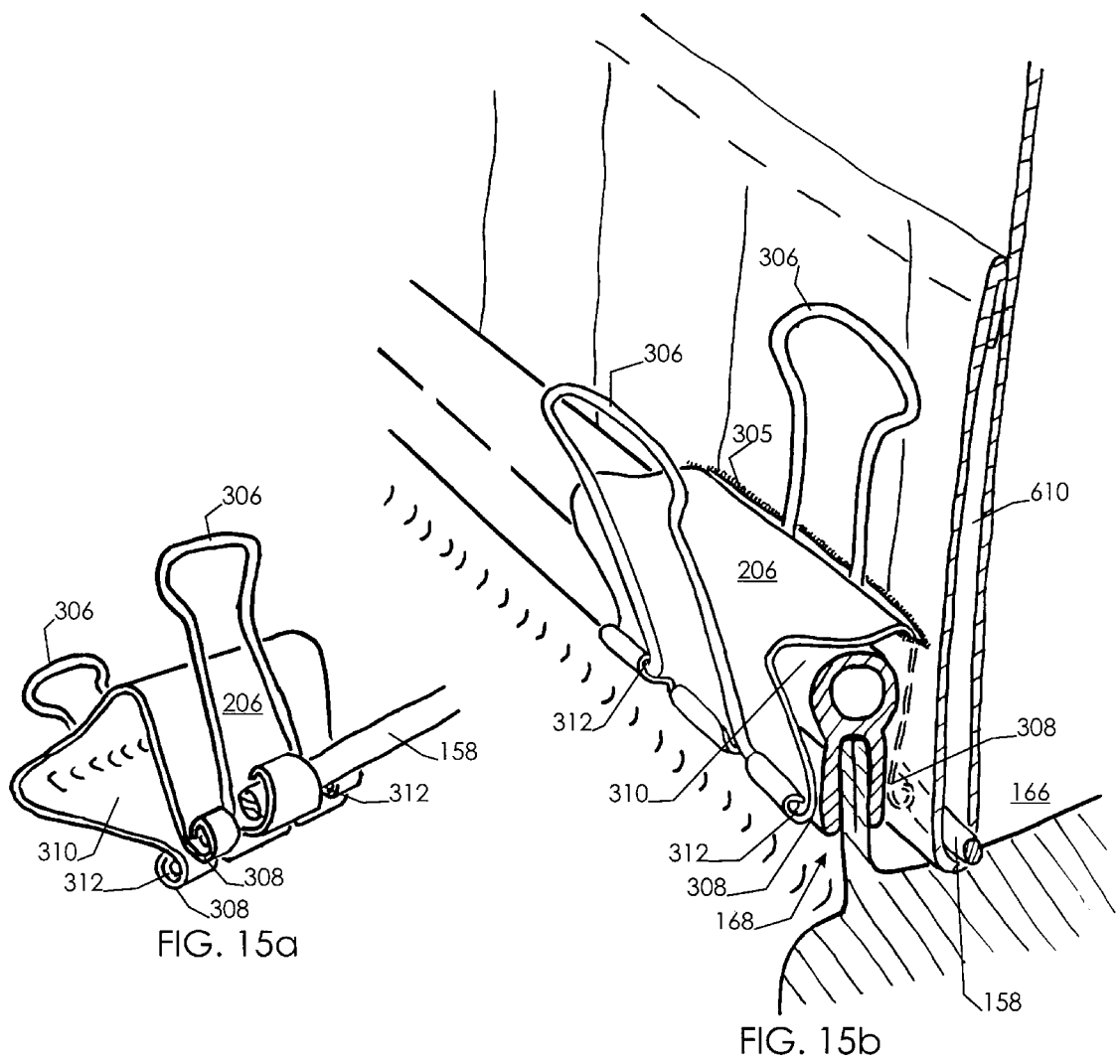
FIG. 15a
FIG. 15b

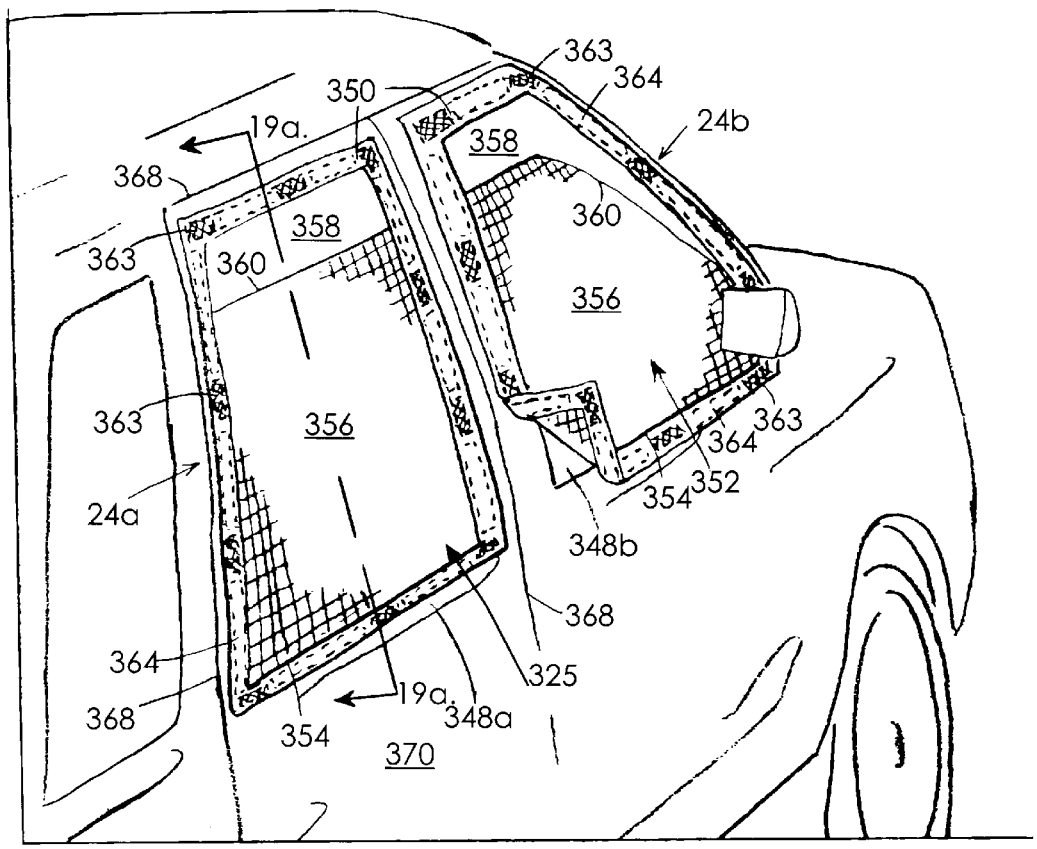
FIG. 18
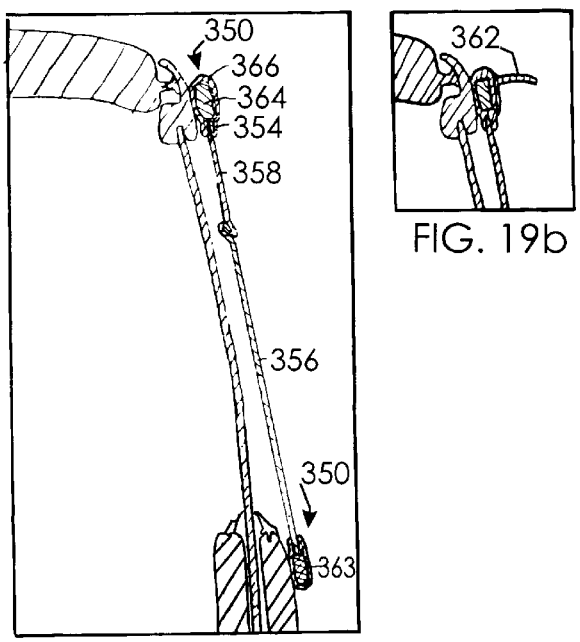
FIG. 19a
FIG. 19b

VEHICLE/TENT CAMPING SYSTEM

FIELD OF THE INVENTION

This is a continuation of application Ser. No. 08/192,149 filed Feb. 4, 1994, now abandoned.

This invention relates to a tent-like enclosure structure particularly adapted and constructed as an extension for a conventional covered vehicle. The invention also relates to the combination of a tent-like enclosure structure and a covered vehicle. In addition the invention relates to a configuration of and retraction device for door, window and/or other flexible panels of tent-like enclosures. This invention also relates to the adaptation, connection and/or mounting methods and means of a tent-like enclosure structure to a covered vehicle's upward opened hatch, rear rain gutter and downward opened tailgate. My invention also relates to rain/sun fly devices attached to a vehicle and/or a conventional tent. In addition my invention relates to vehicle side window ventilation and privacy screens.

DISCUSSION OF THE PRIOR

Generally speaking, flexible covers for connection to the rear end of various types of motor vehicles have been known in prior art. See, for example, the following prior art Pat. Nos.:

4,867,502 Sylvester 19 Sep. 89
4,657,299 Mahan 14 Apr. 87
4,652,040 Mahan 24 Mar. 87
4,566,729 Magnino 28 Jan. 86
4,544,195 Gunn 1 Oct. 85
4,294,484 Robertson 13 Oct. 81
3,774,957 Basaraba 27 Nov. 73
3,390,913 Hunter 2 Jul. 68
3,259,422 Canon 5 Jul. 66

In addition to the above patents, I have been made aware of a similar product being sold in the United States through the "Gander Mountain" catalogue Camping Gear & Clothing 1993 issue page 15.

Most of the above patents disclose devices for enclosing the bed area of a pickup truck, whereas my invention encloses the rear tailgate area and side area and windows of a vehicle.

The Sylvester patent is relevant in that it discloses a tent-like enclosure which is attached to the rear of a vehicle, and said enclosure is primarily supported by an upward-opening hatch of said vehicle, as can my invention; however, the enclosure of this patent extends to the ground; my invention and the resulting sleeping area is wholly supported by the vehicle. Also the upward-opening hatch of this patent uses standard poles for support unlike my invention.

The Basaraba and Canon patents disclose enclosure devices which cover large areas of the vehicles' roof, and the tailgate area is covered by a drape like device affixed to the enclosure mounted on the roof. This method of affixing a tailgate enclosure is entirely unrelated to the methods used for my invention; nor does my invention significantly cover the roof area.

The Gander Mountain advertisement discloses a device which is relevant in that the device encloses the tailgate area of covered hard body vehicles. However, the device is much more difficult and time consuming to attach and much more damaging to the vehicle than is my invention. Also, the device in the Gander Mountain ad, unlike my invention, does not fit vehicles with a swing-out spare tire (a popular device), permanently mars the appearance of the vehicle, reduces visibility from the vehicle and offers few of the abilities of my invention.

The Gunn patent is relevant in that it discloses a tent-like enclosure attached to the rear end of a conventional, ridged camper enclosure of the type adapted to mount over the bed of a conventional pickup truck, as can my invention; however, unlike my invention, the enclosure of this patent requires permanent alteration of the vehicle, fails to take advantage of the inward edge of the upward-opening hatch for attachment of enclosure, offers no support for upward-opening hatch and possesses few of the abilities of my invention.

All of the above prior art tent-like enclosures come in contact with large areas of the vehicle, and therefore rub and permanently damage said areas, or require permanent alteration of the vehicle (unlike my invention). They therefore use more materials, increase the complexity of and time required for attachment of an enclosure to a vehicle. A large area of contact along the rear side of a vehicle also prevents the use of an enclosure with a swing-out spare tire. None of the prior art tent-like devices that enclose the tailgate take advantage of the forward edge of the upward-opening hatch as a primary securing device or the rear rain gutter, used on many vehicles, as a guide, securing and sealing device for the forward edge of an enclosure.

A downward opening tailgate can provide a useful work space and/or seat (perhaps the reader has heard of the popular tailgate parties that precede football games, or the term tailgating). None of the prior art tent-like devices that enclose a tailgate provide quick, easy and full access to said tailgate when its' use is desired as a work space or seat. Also, none of the prior art enclosures provide rain/sun protection for a tailgate work space.

Adequate ventilation is very important to a vehicle/tent enclosure. On hot days a stationary vehicle/tent can become a virtual oven. Cross ventilation can mean the difference between an inhabitable enclosure and an uninhabitable one. None of the prior art tent-like tailgate enclosures block mosquitos and rain while providing cross ventilation. On cold or cool nights, moisture from vehicle/tent occupants will condense on the interior walls of a vehicle/tent, and can damage the interior of a vehicle and much of the equipment within an enclosure. While many of the prior art tent-like tailgate enclosures can provide some ventilation none provide mosquito screened high wall ventilation. If an entire panel is opened to provide moisture ventilation then most of the heat in an enclosure escapes, leaving occupants cold. When using the prior art tent-like tailgate enclosures, an occupant has one of two choices: live with wet interiors or freeze all night.

When a tailgate is opened downward, a gap between the forward edge of said tailgate and the rear edge of the vehicle bed will usually form. This gap can allow insects and wind to enter a tent-like tailgate enclosure. None of the prior art tent-like tailgate enclosures provide blockage of this insect and wind entry.

When a lift support, strut or telescoping tube-like support device is old, cold and/or heavy laden it will tend to partially of fully collapse. When this occurs, the lift, hatch, hood, trunk or other item held by a lift support device closes or falls. This can be dangerous and/or frustrating for the operator of said lift support. None of the prior art devices provide a support device for a lift support strut like device.

Tent panel or flap retraction and tie devices require the use of two hands and two or more steps. And generally tent door flap and zipper configurations are not very versatile, unlike my invention.

In short, my invention uses less material to manufacture, causes less damage to a vehicle, mounts more quickly, offers more safety, seal, support & conveyance, than the above mentioned prior art; and none have the many abilities of my invention which will become evident hereafter.

OBJECTS AND ADVANTAGES

It is an object of my invention to enhance the utility, versatility and safety of vehicles and tents 8.

It is another object of my invention to accomplish the foregoing object by providing a tent-like enclosure structure, which is particularly adapted to, wholly supported by and constructed as an extension for a covered vehicle.

It is another object of my invention to provide a novel combination of such a covered vehicle and such a tent-like enclosure structure, which combination can quickly and easily be put together by the typical user of such combination.

It is another object of my invention to provide novel, convenient and less damaging methods of attaching/ mounting a tent-like enclosure structure to a covered vehicle's upward-opening hatch, rear rain gutter and/or downward-lowering tailgate.

It is another object of my invention to provide adaptation or substitution devices for vehicles having no upward-opening hatch, rear rain gutter and/or downward-lowering tailgate.

It is another object of my invention to provide a novel method of keeping insects, wind and other weather out of a vehicle with side windows at least partially rolled down. One advantage of this object is that it will provide occupants with valuable cross and high wall ventilation.

It is another object of my invention to provide a novel method of keeping insects and weather from significantly affecting said enclosure. This will provide means of blocking the gap formed between the downward-opened tailgate and the vehicle bed.

It is another object of my invention to provide a novel, convenient and relatively inexpensive method of securing lift support, strut, telescoping tube-like support, shock or hydraulic devices.

It is another object of my invention to provide a novel, convenient, more useful and easily operated tent door configuration. This includes providing high wall night time moisture ventilation.

It is another object of my invention to provide a novel and convenient flexible panel pull/tie system, requiring the use of only one hand and one action.

It is another object of my invention to provide a method of using the tent door itself or a separate canopy as a rain and sun fly using poles that do not interfere with the area below said fly.

It is another object of my invention to accomplish the foregoing objects while providing quick, easy and full access to a tailgate, when present, as a work space and/or seat.

It is another object of my invention to accomplish the foregoing without causing significant damage to; and/or making any holes in the vehicle to which the enclosure structure is attached. An advantage of this object is the preservation of an enclosures' usefulness and seal area when a swing out spare tire is present on the vehicle. Another advantage is that my invention contacts a minimum area of the vehicle while providing a secure connection and seal with said vehicle.

It is another object of my invention to accomplish the foregoing objects in a relatively inexpensive manner, but at the same time in a comfortable and aesthetically pleasing manner.

Further objects and advantages of my invention will become apparent from a consideration of the following detailed description, claims and accompanying drawings.

DRAWING FIGS.

In the drawings, closely related figures have the same number but different alphabetic suffixes.

FIG. 1. is a perspective view of a covered vehicle having a swing out spare tire, a downward opened tailgate, an upward opened hatch and a rear rain gutter, with a tailgate tent enclosure, side window screens and a rain/sun fly, according to my invention, attached thereto, with portions broken away to show attachment and internal detail.

FIG. 2. is a perspective view of a covered vehicle having a downward-opened tailgate, an upward-opened hatch and a rear rain gutter, with a tailgate tent enclosure, according to my invention, attached thereto, with a portion broken away to show attachment details.

FIG. 3. comprises a bottom plan view of the rear portion of a vehicle having a downward-opened tailgate, an upward-opened hatch and a rear rain gutter, with a tailgate tent enclosure, according to my invention, attached thereto.

FIG. 4. is a horizontal sectional view taken substantially on line 4—4 of FIG. 1, with portion of tent enclosure broken away to show vehicle detail.

FIG. 5*a*. is a vertical sectional view taken substantially on line 5—5 of FIG. 3, with portion of tent enclosure broken away to show attachment detail.

FIG. 5*b*. is a detail of a securing hook in use.

FIG. 6*a* shows a fragmented side elevation view of a conventional pickup truck with ridged camper enclosure with no rear rain gutter, upon the rear of which is a tailgate tent, according to my invention, attached thereto, with portion of tent broken away to show internal detail.

FIG. 6*b*. shows a fragmented perspective view of a covered vehicle having a downward-opened tailgate but no upward-opening hatch or rear rain gutter, upon the rear of which is a tailgate tent, according to my invention, attached thereto.

FIG. 7*a*. is a perspective view of a covered vehicle having an upward-opened hatch, a rear rain gutter but no downward-opening tailgate, with a tailgate tent, according to my invention, attached thereto, with portions broken away to show internal detail.

FIG. 7*b*. is a perspective view of a covered vehicle having an upward-opened hatch, a rear rain gutter but no downward-opening tailgate, with a tailgate tent, according to my invention, attached thereto, with one side unzipped and retracted to show a convenient entrance and exit.

FIG. 7*c*. is a perspective view of a covered vehicle having an upward-opened hatch, a rear rain gutter but no downward-opening tailgate, with a tailgate tent, according to my invention, attached thereto, with both sides unzipped with rear panel and artificial tailgate placed on top of enclosure, to show an easy access configuration, detail construction, attachment and support mechanisms.

FIG. 7*d*. is a detail of a forward corner pocket and securing hook in use.

FIG. 7*e*. is a detail of a forward corner envelope and securing hook in use; view being the same as that in FIG. 7*d*.

FIG. 8*a*. is a perspective view of a covered vehicle having no upward-opening hatch or downward-opening tailgate, but having a rear rain gutter and similar-sized vertically-opening opposing doors, with a tailgate tent, according to my invention, attached thereto, with portions broken away to show internal and attachment detail.

FIG. 8b. is a detail of a section of a door-mounting artificial hatch in use.

FIG. 8c. is a perspective view of a covered vehicle having no upward-opening hatch or downward-opening tailgate, but having a rear rain gutter and similar-sized vertically-opening opposing doors, with a tailgate tent, according to my invention, attached thereto, with center zipper unzipped to show a convenient entrance and exit.

FIG. 9a. is a perspective view of a covered vehicle having no rear rain gutter, upward-opening hatch or downward-opening tailgate, but having dissimilar-sized vertically-opening opposing doors, with a tailgate tent, according to my invention, attached thereto.

FIG. 9b. is a detail of a section of a roof-mounting artificial hatch in use.

FIG. 9c. is a detail of a section of a roof-mounting artificial hatch in use.

FIG. 10. is a perspective view of an embodiment of a wedge device.

FIG. 11a. is a perspective view of an embodiment of a universal support sleeve.

FIG. 11b. is a perspective view of an embodiment of a custom support sleeve.

FIG. 11c. is a perspective view of an embodiment of a support clamp.

FIG. 12a. is a cross sectional view of a universal support sleeve attached to a small lift support.

FIG. 12b. is a cross sectional view of a universal support sleeve attached to a large lift support.

FIG. 13. is a side elevation view of a person attaching a custom support sleeve to a lift support.

FIG. 14a. is a perspective view of an embodiment of a securing hook, sewn to tent fabric.

FIG. 14b. is a perspective view of an embodiment of a securing hook, attached to tent fabric through the use of a webbing loop.

FIG. 14c. is a perspective view of an embodiment of a securing hook, attached to tent fabric through the use of button holes.

FIG. 14d. is a perspective view of an embodiment of a securing hook, attached to tent fabric through the use of a button hole.

FIG. 15a. is an enlarged fragmented view of a rear rain gutter clamp with an elastic cord attached thereto.

FIG. 15b. is an enlarged fragmented view of a rear rain gutter clamp with a forward hem attached thereto, clamped to a rain gutter lip.

FIG. 16. is a perspective view of a covered vehicle having a tailgate tent enclosure and rain/sun fly pole assembly, according to my invention, attached thereto.

FIG. 17a. is a front view of a rain/sun fly pole assembly.

FIG. 17b. is a side view of a rain/sun fly pole assembly.

FIG. 18. is an enlarged fragmented view of a covered vehicle having side window screens, according to my invention, attached thereto.

FIG. 19a. shows an enlarged cross-sectional elevation view of an edge portion of a side window screen of FIGS. 1 and 18 as viewed along 18 cross-sectional lines 19a—19a of FIG. 18.

FIG. 19b. shows the enlarged cross-sectional elevation view of FIG 19a with an additional rain visor attached thereto.

DESCRIPTION OF PREFERRED EMBODIMENTS

As required, detailed embodiments of my invention are disclosed herein; however, it is to be understood that the disclosed embodiments are merely exemplary of my invention which may be embodied in various forms. Therefore, specific combination, structural and functional details disclosed herein are not to be interpreted as limiting, but rather merely as a basis for the claims and as a representative basis for teaching one skilled in the art to vicariously employ my invention in virtually any appropriately detailed structure.

Figure 1:
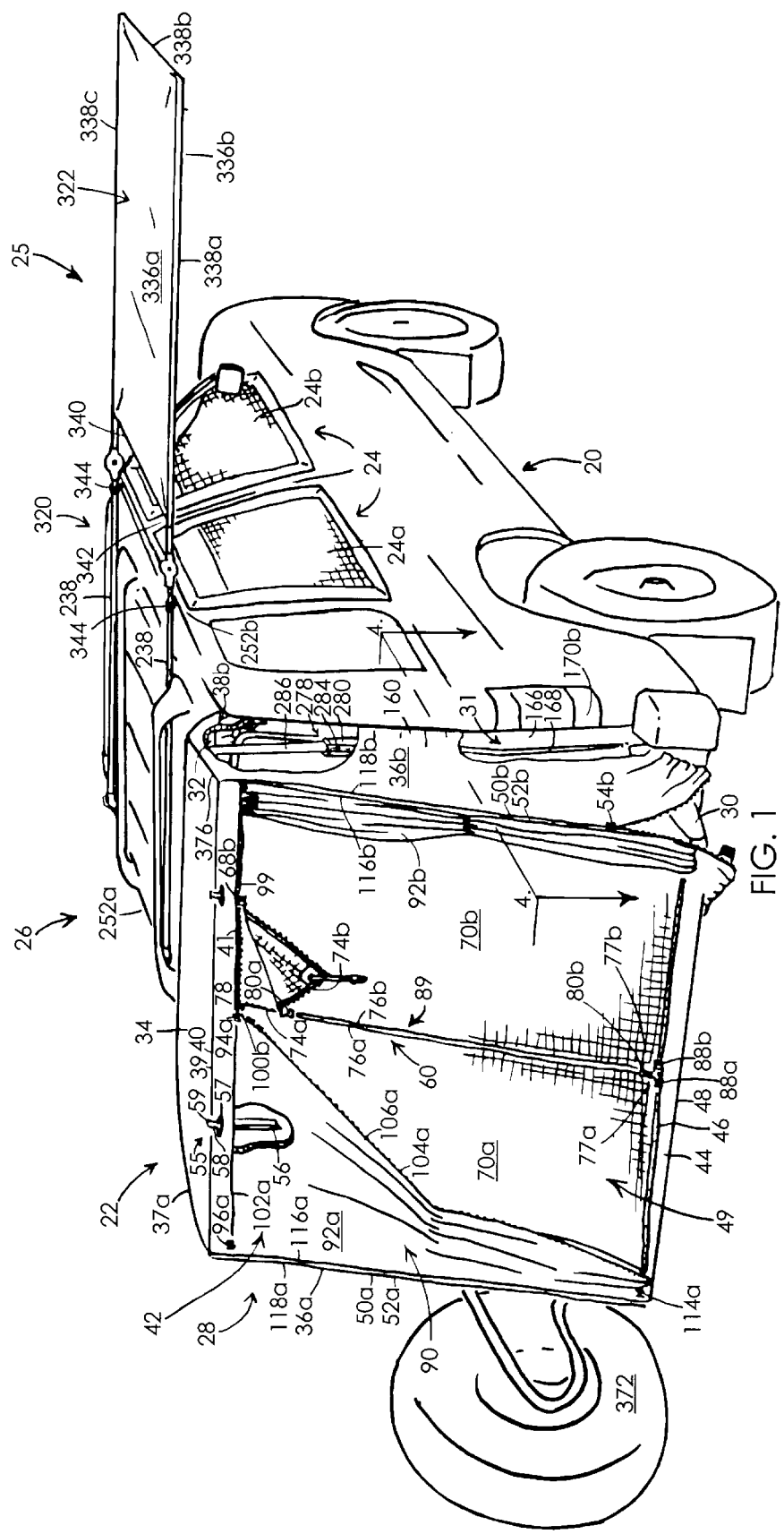

Referring to FIG. 1. the combination of a vehicle 20, a rear tent-like extension enclosure or tailgate tent 22, side window screens 24 (which are particularly designated as side window screen 24a and side window screen 24b) and a rain/sun fly 25 is designated broadly by the numeral 26.
Description-shell detail As in FIG. 1 and FIG. 3, my invention comprises a method and means of enclosing a tailgate area with a tailgate tent 22 which generally comprises a tent covering or shell 28 mounted on a conventional downward tilting/opening tailgate 30, a rear water channel, seal or rain gutter 31 and a conventional upward-opening rear door or hatch 32 of a vehicle 20. The shell 28 generally consists of several parts; a flexible fabric top 34 which is affixed, such as by being sewn, to sides 36a and 36b such as along seams 37a and 37b. Please note that seams 37a and 37b extend beyond the forward edge of hatch 32, turn sharply and extend a short distance downward along the forward edge of sides 36a and 36b. This corner construction and the resulting pockets, constitute what will be referred to as forward corner pockets 38a and 38b, see FIG. 7d. The top 34 bends downward along the rear edge of hatch 39 and extends a distance (portion of top here after referred to as top segment 40) to allow an operator within the enclosure easy access to seam 41, the reason for this will become apparent during a detailed discussion of the door panel 42. The top 34 is affixed to the door panel 42 such as along seam 41. The door panel 42 is affixed, such as by being sewn, to the enclosure bottom 44 such as along seam 46. The bottom 44 extends downward bending along rear edge of tailgate 48. Rear panel 49 of this embodiment includes the combination top segment 40, door panel 42 and bottom 44, and is attached such as by being sewn to zipper ribbons 50a and 50b which are affixed to the sides 36a and 36b such as along slits 52a and 52b. This arrangement allows the rear panel 49 to be quickly and easily disconnected from the sides 36a and 36b by use of zipper slides 54a and 54b along zipper ribbons 50a and 50b. This disconnection allows an operator on the outside of the enclosure to roll up the rear panel 49 and secure roll, using button ties 55 and loop ties 56, tuck back sides 36a and 36b and have full and easy access to the tailgate 30 as a work space and/or seat, as shown in FIG. 6b. Button ties 55 are comprised of long buttons 57 with button ribbons 58 threaded through said buttons. Button ribbons 58 and loop ties 56 are affixed, such as by being sewn, to top 34 with said button ribbons on the outside and said loops on the inside of said top, such as along seams 59.

Figure 2:
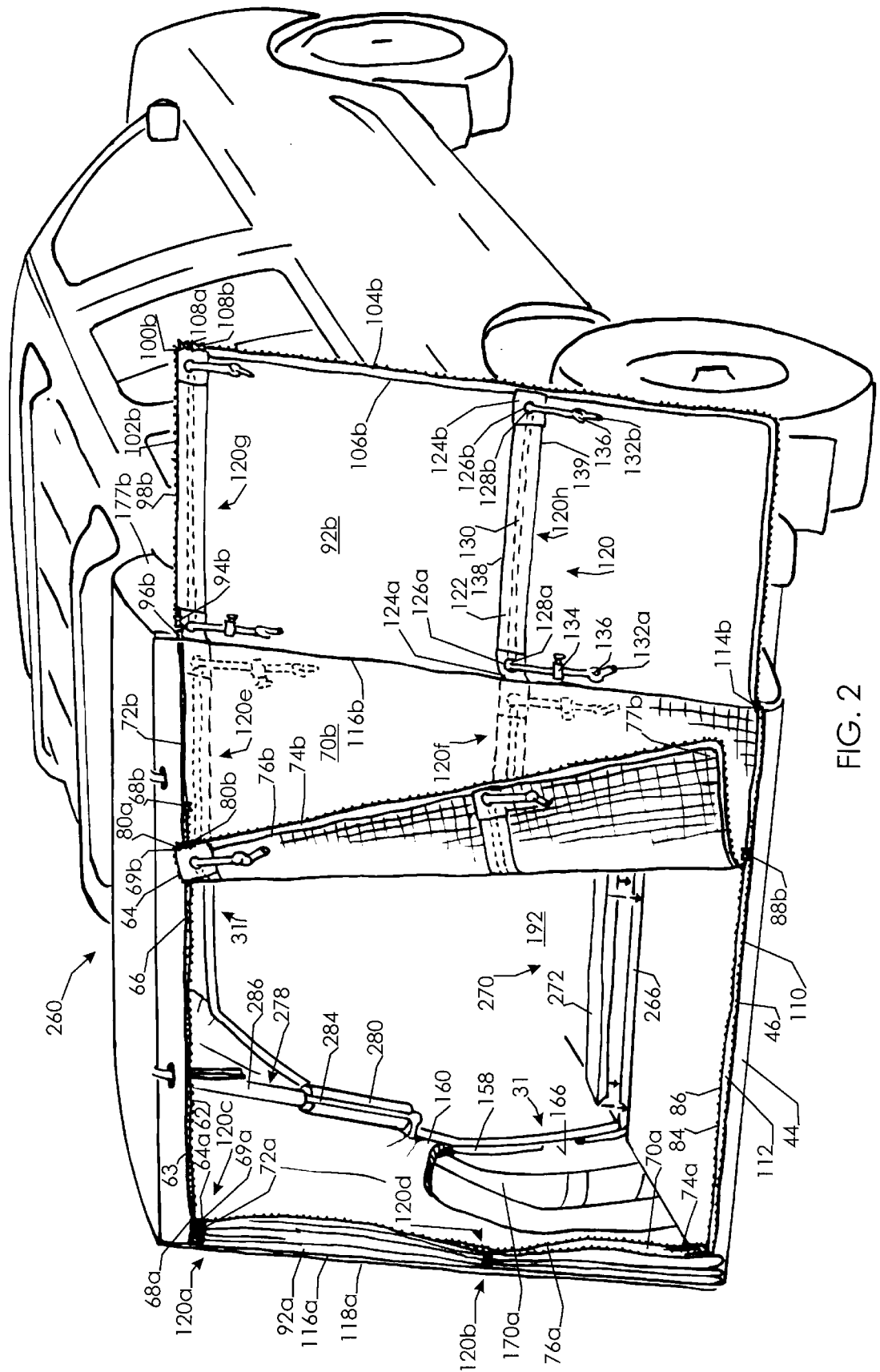

Referring to FIG. 1 and FIG. 2 my invention comprises a novel "I" shaped tent zipper/door configuration 60. This "I" tent door configuration 60 comprises the above mentioned rear panel 49 with above mentioned method affixing to sides 36a and 36b. The door panel 42 is affixed to top segment 40 such as at seam 41. At seam 41 top segment 40 is affixed, such as by being sewn, to half zipper ribbon 62 and half zipper ribbon 63. Half zipper ribbon 62 is connected to half zipper ribbons 64a and 64b such as by being zipped along slit 66 such as by the manufacturer starting and/or operator running zipper slides 68a and 68b toward each other. At the inner end of half zipper ribbons 64a and 64b zipper stops 69a and 69b are affixed such as by being pushed through teeth of zipper and being crimped in place. Half zipper ribbons 64a and 64b are affixed, such as by being sewn, to mosquito net screen flaps 70a and 70b such as along seams 72a and 72b. Screen flaps 70a and 70b are affixed, such as by being sewn, to half zipper ribbons 74a and 74b such as along seams 76a and 76b. It should be noted that seams 76a and 76b run generally downward along inner sides of screen flaps 70a and 70b turning at the bottom inside corners 77a and 77b of said flaps and continuing along the bottom edges away from each other to the bottom outside corners of said flaps. It should also be noted that half zipper ribbons 74a and 74b are a matched pair with conventional double tongue and double zipper slide configuration designed to allow the said pair to be completely disconnected at point 78, when both zipper slides 80a and 80b are run to point 78. Screen flaps 70a and 70b can be connected or disconnected such as by conventional use of zipper slides 80a and 80b such as along slit 82. The outward turned segments of half zipper ribbons 74a and 74b are connected, such as by being zipped, to half zipper ribbon 84 such as along slit 86, such as by manufacturer starting and/or operator running zipper slides 88a and 88b toward each other. The completed screen door configuration will be hereafter designated by numeral 89.

The completed outer door configuration 90 is identical to the screen door configuration 89 with two notable exceptions. First, the outer flaps 92a and 92b are a weather repellent fabric, not mosquito screen. And second, where the screen door configuration 89 only uses one zipper slide 68a and 68b along each half zipper ribbon 64a and 64b, the outer door configuration 90 uses two: inner zipper slides 94a and 94b oriented identically to those of said screen slides, and outer zipper slides 96a and 96b oriented to disconnect zipper teeth when run toward each other. The reader may wish to skip the next paragraph for in it the previous paragraph will be repeated adding new reference numbers, names and said exceptions.

Referring to FIG. 1 and FIG. 2 the door panel 42 is affixed to top segment 40 such as at seam 41. At seam 41 top segment 40 is affixed, such as by being sewn, to two half zipper ribbons 62 and 63. Half zipper ribbon 63 is connected to half zipper ribbons 98a and 98b such as by being zipped along slit 99 such as by the manufacturer starting and/or operator running inner zipper slides 94a and 94b toward each other. A disconnecting set of outer zipper slides 96a and 96b are started at outer ends of slit 99, the reason for this will become clear during a detailed discussion of rain/sun fly 25 attachment. At the inner end of half zipper ribbons 98a and 98b zipper stops 10a and 100b are affixed such as by being pushed through teeth and said half zipper ribbons and being crimped in place. The half zipper ribbons 98a and 98b are affixed, such as by being sewn, to outer flaps 92a and 92b such as along seams 102a and 102b. Outer flaps 92a and 92b are affixed, such as by being sewn, to half zipper ribbons 104a and 104b such as along seams 106a and 106b. It should be noted that seams 106a and 106b run generally downward along inner sides of outer flaps 92a and 92b turning at the bottom inside corners of said flaps and continuing along the bottom edges away from each other to the bottom outside corners of said flaps. It should also be noted that half zipper ribbons 104a and 104b are a matched pair with conventional double tongue and double zipper slide configuration designed to allow the said pair to be completely disconnected at point 78, when both zipper slides 108a and 108b are run to point 78. Outer flaps 92a and 92b can be connected or disconnected such as by conventional use of zipper slides 108a and 108b along half zipper ribbons 104a and 104b. The outward turned segments of half zipper ribbons 104a and 104b are connected, such as by being zipped, to half zipper ribbon 110 such as along slit 112, such as by manufacturer starting and/or operator running zipper slides 114a and 114b toward each other.

Half zipper ribbon 84 and 110 are attached, such as by being sewn, to bottom 44, such as along seam 46. Outer flaps 92a and 92b are attached, such as by being sewn, to screen flaps 70a and 70b and zipper ribbons 50a and 50b, such as along seams 116a and 116b. Zipper ribbons 50a and 50b are attached, such as by being sewn, to sides 36a and 36b, such as along seams 118a and 118b.

Referring to FIG. 2 my invention comprises a novel method and means for retracting and holding tent panels; these devices will be designated as pull ties 120 (which are particularly designated as pull tie 120a–120h). A pull tie 120h comprises a ribbon or panel of fabric 122 with reinforcing patches 124a and 124b, such as leather, affixed, such as by being sewn, on the ends of said fabric. Eyelet holes 126a and 126b are made, such as by being punched, through fabric 122 and patches 124a and 124b. Eyelets 128a and 128b are pushed through eyelet holes 126a and 126b and affixed, such as by being crimped. The ends of a draw string 130, such as having a slightly greater outer dimension than internal dimension of eyelets 128a and 128b, are threaded through said eyelets, with care being taken to ensure ends of said string exit the same side of said fabric and that said fabric is not twisted. The string end 132a is threaded through a conventional string locking device 134 and tied in a knot 136. The other end 132b is tied in a knot 136. The fabric 122 is then affixed, such as by being sewn, to a panel; in this case an outer flap 92b, such as along seam 138. Special care should be taken to prevent string 130 from being sewn into seam 138. The fabric 122 is then affixed, such as by being sewn, to outer flap 921b, such as along seam 139. Again special care should be taken to keep string 130 between seam 138 and seam 139. The ends of fabric 122 and patches 124a and 124b are sewn in seams 116b and 106b. It is anticipated that a series of eyelets with a string weaving through them, will achieve a similar result. It is also anticipated that fabric 122 can be replaced by loops, rings, belts, clips, essentially any method of attaching a panel to string 130 and allowing said string to slip through said attachment, without allowing string end 132a or 132b to slip through said attachment. It is also anticipated that string 130 can be replaced by, for example: rope, wire, elastic cord, ribbon or webbing. All will have different results when pulled through, for example: eyelet, grommet, lined hole or unlined hole. It is also anticipated that string lock 134 can be eliminated.

Pull ties 120 are constructed, such as described above, and attached to the inside of door panels, such as at indicated locations for pull tie 120b–120h, see FIG. 2 and FIG. 5a.

It is anticipated that "I" tent door configuration 60 and pull ties 120 are easily adapted for use with any flexible panel or flap as will become evident below.

Description-attachment details with additional shell detail

My invention can be adapted to fit a variety of vehicles. Various vehicles have differently configured rear openings. My invention generally attaches to a tailgate 30, a rear rain gutter 31 and a hatch 32; these vehicle parts or appendages offer attachment, securing, sealing, guiding and/or supporting means of attaching sides 36a&b, top 34 and bottom 44 to a vehicle 20.

Referring to FIG. 3 and FIG. 5a&b, my invention comprises a novel method and means of attaching and sealing shell 28 to a covered vehicle 20 using said vehicles downward-opening tailgate 30. My invention comprises a novel method and means of using a downward-opened tailgate 30 as a primary anchor and seal for attaching shell 28 to a vehicle 20. In this manner the detachability of rear panel 49 from sides 36a and 36b is preserved and shell 28 is held firmly in place and effective seals against wind and insects are achieved. As discussed above, bottom 44 is attached to sides 36a and 36b through zipper ribbons 50a and 50b, and can be disconnected by conventional use of zipper slides 54a and 54b. Bottom 44 is long enough to cover or encompass tailgate obstacles such as handle 140 and/or windshield wiper 142, and then be significantly pulled up against tailgate 30 by an elastic cord 144 which is stretched and sewn in hem 146 and affixed, such as by being sewn, at seams 148a and 148b. Sides 36a and 36b bend at tailgate outside edges 150a and 150b and extend to meet the corner of bottom 44. The bottom edge of said sides are held under tension from stretched elastic cord 152 sewn in hems 153a and 153b and attached, such as by being sewn, at seams 154a and 154b. Please notice hem 146 is attached to hems 154a and 154b through a VELCRO-like hook strip 155 and a VELCRO-like loop patch 156, and are attached such as by sewn, along seams 148a&b and 154a&b. This configuration allows hems 153a, 153b and 146 to be stretched and attached before zipper ribbons 50a and 50b are closed, making this operation much more secure and easier for the operator. It is anticipated that hook strip 155 and loop patch 156 may be replaced by, for example: snaps, buttons or hooks, and that this is not necessary. Please notice hems 146, 154a and 154b are arched and together make a substantially oval shaped elastic cord or hem system 157, in FIG. 3. While hems 146, 154a and 154b do not have to be cut and constructed this way, this oval elastic hem system 157 offers tension across the entire width of sides 36a, 36b and rear panel 49. This tension pulls side and rear panels 36a, 36b and 49 tight making them work and look much better.

Referring to FIG. 1–5, elastic cord 144 and elastic cord 152 hold shell 28 down and to tailgate 30, elastic cord 158 holds said shell to and against vehicle 20 see FIG. 3. The forward edges of top 34 and sides 36a&b are folded and sewn to make an encircling forward hem 160, see FIG. 15b. Elastic cord 158 is threaded up through forward hem 160 of side 36a, continuing through said forward hem of top 34 and back down through said forward hem of side 36b finally being affixed to itself, such as by being crimped or tied in a knot 162. When shell 28 is properly attached to vehicle 20, forward hem 160 is forward of and hooked around tailgate forward corners 164a and 164b such as is shown feel in FIG. 3.

Referring to FIG. 1–5&7c, my invention comprises a method and means of attaching and sealing shell 28 to a covered vehicle 20 using said vehicle's rear rain gutter 31. FIG. 1,2,4 & 5 illustrate how the forward edges of sides 36a and 36b are pulled into rain gutter channel 166 outside rain gutter lip 168 and inside rear sides of vehicle 170a and 170b by elastic cord 158 in forward hem 160. This arrangement provides stability and expands seal surface contact area, as well as secures side walls 36a and 36b. Wind, rain and snow are unable to push under forward hem 160 keeping the enclosure pleasant and dry. Hem 160 is held still so that vehicle 20 is not scratched or marred by said hem moving or flapping in the wind. FIG. 4 and FIG. 5 illustrate a common embodiment of a rear rain gutter 166 as part of vehicle rear side 170a&b and rear top 172. FIG. 7c shows how in some vehicles 20 a rear rain gutter 31 not only encircles the sides and top of a rear opening 173 but may run along the bottom of rear opening 173, to completely surround said opening. Devices used to attach a tailgate tent 22 directly to a rain gutter lip are described below.

Referring to FIG. 1–5&7, my invention comprises a method and means of attaching and sealing shell 28 to a covered vehicle 20 using said vehicle's hatch 32. FIG. 5a illustrates how top 34 can encase common hatch obstacles such as windshield wiper 174 and wind jam 176 and be pulled against rear top 172 by elastic cord 158 in forward hem 160, making a wind and insect seal and securing shell 28 to vehicle 20. When shell 28 is properly attached to vehicle 20, forward hem 160 is forward of, folded, hooked and sewn around hatch 32 forward corners 177b by forward corner pocket 38b, see FIG. 7d. To prevent the area of the forward hem 160 between the forward corners 177a and 177b from pulling away from rear top 172, securing hooks 178 can be attached, such as by being sewn, to top 34 and hooked to hatch forward edge 179 and/or wind jam 176 as in FIG. 5b & 7c, d&e. It is anticipated that securing hook 178 may be attached through other means such as: slipping side segments or wings of said hook into a large button hole, rivetting, snapping, buttoning or gluing to give a few. Devices used to attach a tailgate tent 22 to and support, a hatch 32 are detailed below.

Description-adapting devices for absent vehicle parts with shell options

Many vehicles on the market do not have all or any of the above mentioned parts and/or appendages: hatch 32, rear rain gutter 31 and tailgate 30. For these vehicles adaptations must be made.

Figure 6A:
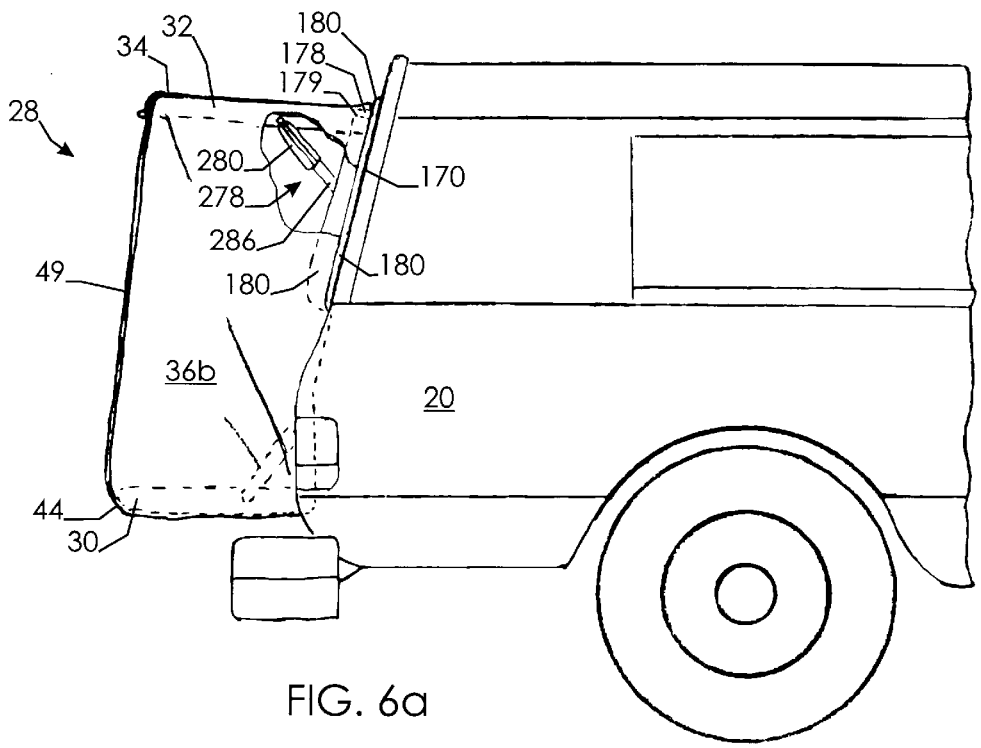
Figure 6B:
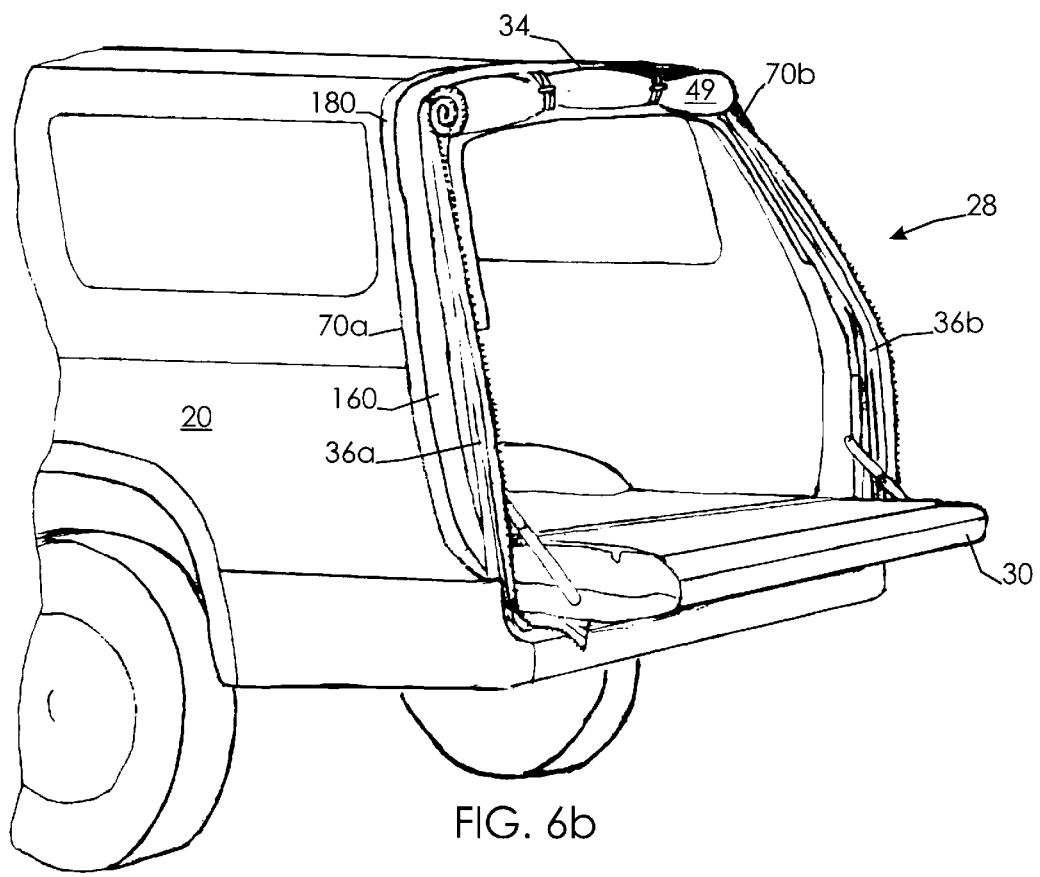

Referring to FIG. 6a, my invention comprises a method and means of adapting, attaching and sealing shell 28 to a vehicle 20 having no rear rain gutter 31 such as that described above. Top 34 and sides 36a&b are constructed and attached as described above. Please notice, the construction and attachment of flexible rain gutter sealing belt 180 a flexible, shape resilient, waterproof, scratch resistant and slip resistant strip of material, such as closed cell neoprene, which is attached, such as by being sewn, along forward hem 160 with a segment extending beyond hem 160. When shell 28 is properly attached to vehicle 20, the mentioned segment of sealing belt 180 is bent upward and outward against rear side of vehicle 170. Securing hooks 178 can also be attached to upward opened hatch 32. This arrangement provides a reliable non-slip seal area along forward hem 160 and adequate water drainage.

Referring to FIG. 6b, my invention comprises a method and means of attaching and sealing shell 28 to a vehicle 20 having no rear rain gutter 31 such as that described above. Top 34 and sides 36a&b are constructed and attached as described above. FIG. 6b illustrates another construction and attachment of sealing belt 180 a flexible non-slip, non-scratch and water resistant strip, belt or panel of fabric, such as closed cell neoprene, which is attached, such as by being sewn, along forward hem 160. When shell 28 is properly attached to vehicle 20, sealing belt 180 is positioned on outside walls of vehicle as shown in FIG. 6b. This arrangement provides a reliable non-slip and non-scratch seal area along forward hem 160 and adequate drainage.

Figure 7A:
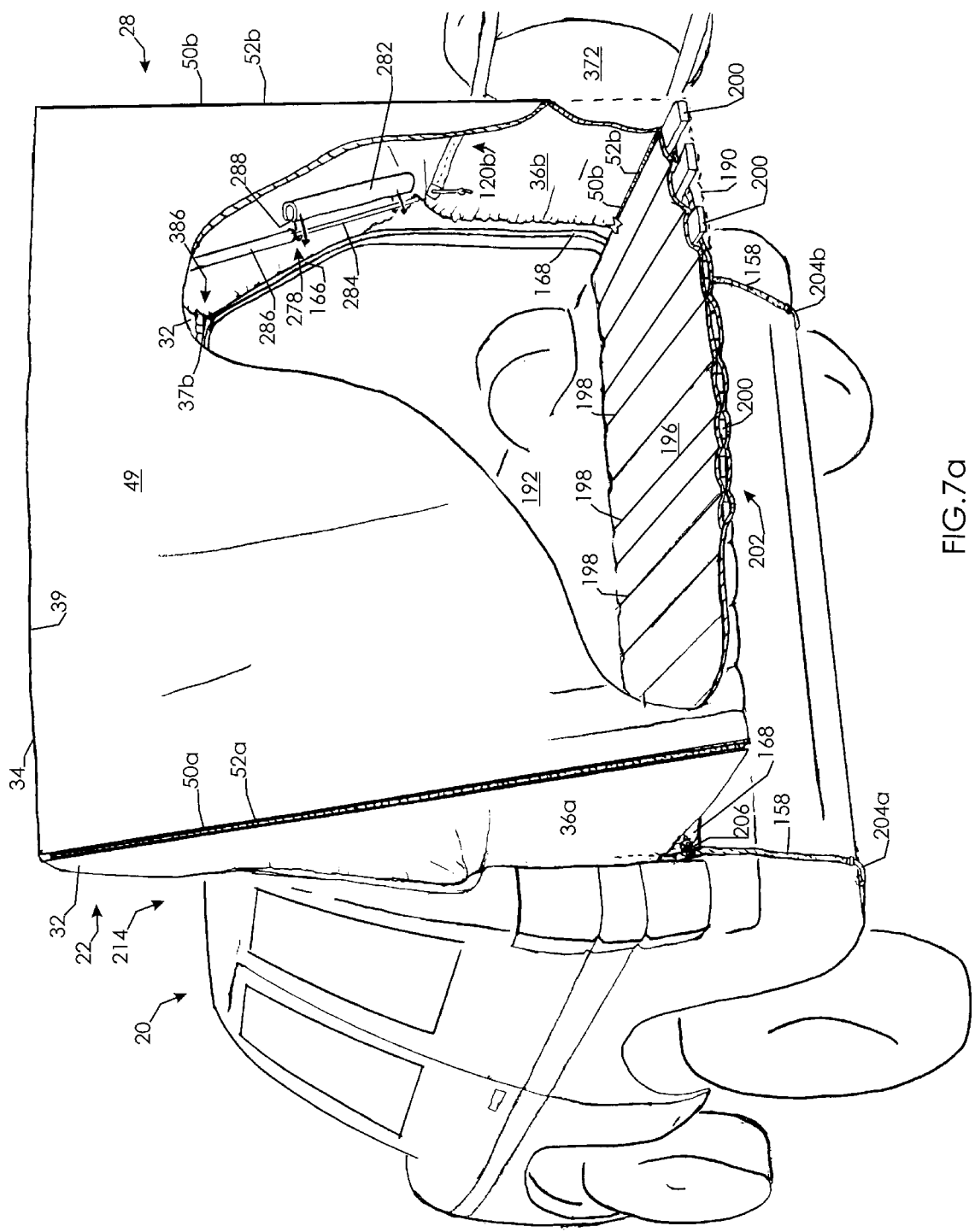
Figure 10:
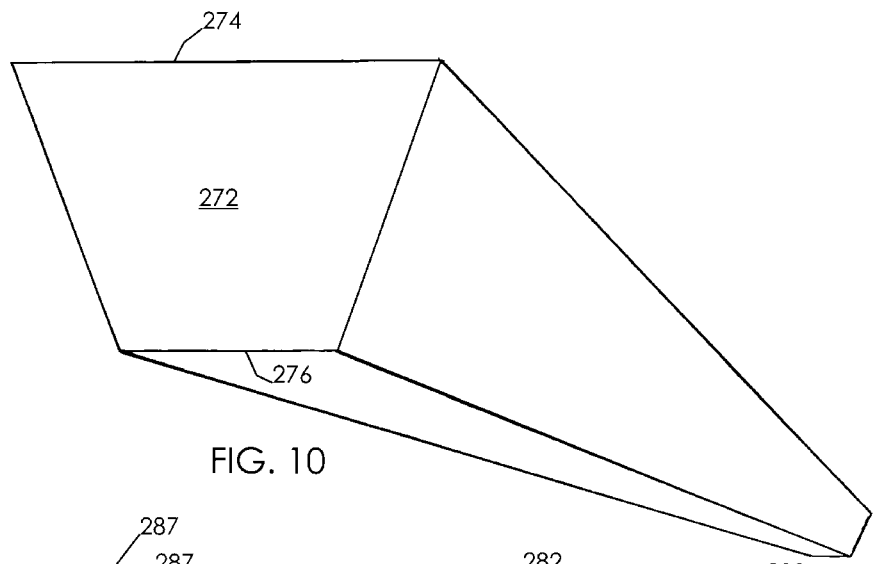

Referring to FIG. 7a–c, my invention comprises a method and means of attaching and sealing shell 28 to a vehicle 20 having no tailgate 30 such as that described above, at the same time providing a substitute tailgate support system for tailgate tent 22. For this embodiment, top 34, is constructed as described above. Top 34, sides 36a&b and rear panel 49 are attached to each-other and vehicle 20 as described above, excluding paragraphs 86 and 87. However two different means of attaching top 34 to hatch 32 are illustrated here in FIG. 7d and FIG. 7e. FIG. 7d illustrates what has already been described as a forward corner pocket 38b. FIG. 7e illustrates a forward corner envelope 182. Forward corner envelope 182 comprises a fabric segment 184 which is affixed, such as by sewing, to top 34 such as along seam 37b and seam 186 as in FIG. 7e. When attaching shell 28 to vehicle 20 using forward corner envelope 182 slip hatch forward corner 177b (shown in FIG. 7d) into forward corner envelope 182 as in FIG. 7e, then repeat for other hatch forward corner 177a. In this embodiment rear panel 49 is constructed quite differently than described above. Rear panel 49 extends downward from the rear edge of hatch 39 in a vertical plane. Rear panel 49 can be constructed with windows, doors, etc, however this is a weight bearing panel and great care must be taken to assure consistent performance. At line 190 where rear panel 49 intersects the horizontal plane of cargo bed 192, rear panel 49 bends and extends several inches onto cargo bed 192. Rear panel 49 then folds back onto itself and extends back to line 190. The space between artificial tailgate bottom 194 and artificial tailgate top 196 is partitioned, such as by being sewn, along seams 198. Ridged wood slats 200 can then be inserted into partitions to form a limited weight bearing artificial tailgate 202. It is anticipated that a fabric lip, VELCRO-like patches, zippers, buttons or hooks (to name a few) may be used at the mouth of said partitions to hold slats firmly in place. It is anticipated that slats 200 can be constructed of many different materials such as: wood, plastic, foam, mettle, spring mettle, glass, fiberglass, reasons, fiber composites, pressurized gas tubes, self inflating tubes or a combination of them, each will provide different bending, breaking and memory characteristics. It is also anticipated that slats 200 can be constructed using many different material configurations or constructions such as: arched profile (like the curved metallic strips used in window blinds), "I" profile, "U" profile, "V" profile, square or rectangular profile, round or oval profile or house profile to name a few, each will provide different bending, collapsing and breaking characteristics. It is also anticipated that partitions are not necessary, or may be angled differently to provide various performance. For the embodiments of FIG. 7a–c, sides 36a and 36b extend substantially vertically downward from top 34 and are attached, such as by being sewn, to zipper ribbons 50a and 50b which are attached, such as by being sewn, to rear panel 49 and artificial tailgate 202 such as along slits 52a and 52b. Attached, as described above, to the inner side of sides 36a and 36b are pull tie 120a&b. Standard screened windows 203a&b are constructed in the upper portion of sides 36a&b, to offer needed ventilation. Windows 203a&b are typically covered with an open mesh material and the insides thereof have flaps (not shown) which may be used to cover the openings for privacy or rain or weather protection purposes. One side of each of the flaps is sewn to the inner walls of sides 36a & b, and the other sides of the flaps attach thereto be means of zippers or VELCRO-like linings at the edges. Elastic cord 158 can be attached to vehicle 20 with attaching hooks 204a and 204b as in FIG. 7a, or by running elastic cord 158 along the bottom of rear rain gutter lip 168 and connecting, such as by tieing or hooking, the ends of elastic cord 158 together as in FIG. 7c. Whichever attachment method is used, rain gutter clamps 206 (as in FIG. 15a&b) are helpful in securing the lower portions of shell 28 to rain gutter lip 168 and thus to vehicle 20. It is anticipated that rain gutter clamps 206 may be used to hold the ends of elastic cord 158 to vehicle 20 if said ends are tied or knotted to said clamps. It is also anticipated that rain gutter clamps 206 may be attached along forward hem 160 if rivets, bolts, snaps, eyelets, grommets, pockets or button holes (as in FIG. 15b), to name a few, are used to secure said clamps to said hem. It is foreseen that artificial tailgate 202 may be easily adapted for use on vehicle 20 without an accompanying shell 28 or tailgate tent 22.

Referring to FIG. 8a–c, my invention comprises a method and means of attaching and sealing shell 28 to a vehicle 20 having no hatch 32 such as that described above, at the same time providing structural support for top 34, sides 36a&b, and rear panel 49 and artificial tailgate 202. For this embodiment, top 34 and sides 36a&b are constructed as described in paragraph 88. Top 34 is attached to rear panel 49 and sides 36a&b as described above. Sides 36a&b are attached to rear panel 49 as described in paragraph 88. Rear panel 49 is constructed similarly to that described in paragraph 88, with two important exceptions. The first of these exceptions is rear panel 49, including artificial tailgate 202, is split by zipper ribbon 208. This coupled with pull tie 120a&b offers an entrance and exit from the tailgate tent 22 as in FIG. 8c. The second exception is the inclusion of a rear edge tube 210. Rear edge tube 210 comprises a panel or ribbon of fabric 212 and a disconnecting zipper ribbon 214 sewn to each other, top 34 and rear panel 49 as in FIG. 8b. This configuration allows shell 28 to be pulled over a pair of similar sized vehicle doors 216a&b and an attached door mounting artificial hatch pole assembly 218, attached to rear rain gutter 31 and then rear edge tube 210 can be closed around tubular aluminum rear edge pole 220 through the connection of disconnecting zipper ribbon 214. This makes mounting much easier. Rear edge tube 210 generally encircles the entire length of rear edge pole 220, and holds rear panel 49 to rear edge pole 220 firmly. Door pole assembly 218 comprises: rear edge pole 220 which is attached, such as by welding, to rubber coated metal door hooks 222. Cross pole 224 is attached, such as by being welded to one of the door hooks 222 (as in FIG. 8a). A rivet or bolt 226 is used to attach a flattened end of tubular aluminum cross pole 224 to rear edge pole 220 (as in FIG. 8b). And a smooth dome topped tubular aluminum elevation or steeple pole 228 is attached, such as by welding, to cross pole 224 as in FIG. 8a. Steeple pole 228 offers efficient drainage off top 34 and increased head room inside the enclosure. For the embodiment of FIG. 8a–c forward hem 160 attaches to vehicle 20 along the top of rear rain gutter 31, attaching in several places through the use of rain gutter clamps 206. Forward hem 160 extends downward in rear rain gutter 31, leaving rear rain gutter 31 to encompass door hinges 229 as in FIG. 8a. The ends of elastic cord 158 then attach under rain gutter lip 168 as in paragraph 88 FIG. 7c. It is also anticipated that welded attachments may be replaced by, for example: hinges, brackets, universal or ball and socket joints to add variability to door hook 222 angles and make steeple pole 228 collapsible. It is also anticipated that steeple pole 228 may be replaced by an upwardly curved or bent cross pole 224. It is also anticipated that steeple pole 228 may be capped by an end cap to reduce fabrication costs. It is also anticipated that door hooks 222 can be manufactured with different configurations, materials and coatings. It is also anticipated that rear edge tube 210 can be replaced by other attachment devices, for example: hooks, straps, buttons and a VELCRO-like closing tube. Attached, as described above, to the inner side of rear panel 49 are pull tie 120a&b as in FIG. 8c. Standard screened windows 203a&b are constructed in the upper portion of sides 36a&b, to offer needed ventilation. It is foreseen that door pole assembly 218 may be easily adapted for use on vehicle 20 without an accompanying shell 28 or tailgate tent 22.

Referring to FIG. 9a–c, my invention comprises a much more universal method and means of attaching and sealing shell 28 to a covered vehicle 20 having no hatch 32 such as that described above, at the same time providing structural support for top 34, sides 36a&b, rear panel 49 and artificial tailgate 202. The vehicle of this embodiment has no hatch 32, rear rain gutter 31 or tailgate 30. This embodiment features a roof mountain artificial hatch pole assembly 230, sealing belt 180 and artificial tailgate 202. Sides 36a&b and rear panel 49 are constructed as described in paragraph 88. For this embodiment, top 34 is constructed similarly to that described in paragraph 89, however in this case the supporting pole assembly is external to the enclosure. To attach roof pole assembly 230 to top 34 pole tubes 232 are constructed on top 34. Pole tubes 232 are constructed of a panel or ribbon of fabric 234 which is folded and attached, such as by being sewn, to top 34 such as in FIG. 9a&b. It should be noted that pole tubes 232 are of sufficient internal dimension to allow plastic slotted end caps 236, attached to tubular aluminum support poles 238, to be threaded through pole tubes 232. In addition to pole tubes 232 external rear edge tubes 240 are constructed, such as of ribbons or panels of fabric 242, and attached, such as by being sewn, to the upper rear edge of the enclosure, such as in FIG. 9a&b. It should be noted that external rear edge tubes 240 generally run the entire width of rear panel 49 with spaces of sufficient size to allow aluminum "T" brackets 244 to fit between them, such as in FIG. 9a. It should also be noted that external rear edge tubes 240 are of sufficient internal dimension to allow an aluminum external rear edge pole 246 to be threaded through them and "T" brackets 244 as in FIG. 9a. Slotted end caps 236 are attached to support poles 238, such as by being forced and stretched over the end of support poles 238, Support poles 238 are in turn attached, such as by being welded, to "T" brackets 244. Threaded through slotted end caps 236 is a securing strap 248, the ends of which are threaded in a tension adjusting manner (see FIG. 17a) through rubber coated steel door rain gutter hooks 250 as in FIG. 9a&c. More detail regarding slotted end-caps 236 and door rain gutter hooks 250 will be provided below. When shell 28 and roof pole assembly 230 are attached to vehicle 20 correctly door rain gutter hooks 250 are securely and tightly strapped to side door rain gutters 252. This arrangement holds slotted end caps 236 firmly down and against vehicle 20 as in FIG. 9a. This causes support poles 238 to lie along the roof of vehicle 20, making final contact with said roof at fulcrums 254. In this case fulcrums 254 are padded by forward hem 160 and sealing belt 180. If this were not the case, then padding or a buffer would be attached, such as by gluing or encasing, to support poles 238 at fulcrums 254. It should be noted that the side door rain gutter 252 of FIG. 9a is located in the side door area, however many vehicles have side door rain gutters 252 positioned above the side door area. While different side door rain gutters 252 dictate different shapes and sizes of door rain gutter hooks 250, securing strap 248 and door rain gutter hooks 250 can be used with any vehicle 20 having side door rain gutters 252 without significantly affecting side door operation. Such hook and strap systems are routinely used to attach removable ski and luggage racks. Securing strap 248 and fulcrums 254 cause securing poles 238, attached external rear edge pole 246 and attached top 34 to be held horizontally out over the rear opening 173 of vehicle 20, thus serving as a supporting structure for top 34 and in this case also an artificial tailgate 202. Top 34 is attached to rear panel 49 and sides 36a&b as described in paragraph 89. Sides 36a&b are attached to rear panel 49 as described in paragraph 89. And forward hem 160 is attached to sealing belt 180 and vehicle 20 as described in paragraphs 87. It is foreseen that roof pole assembly 230 may be easily adapted for use on vehicle 20 without an accompanying shell 28 or tailgate tent 22. It should be noted that roof pole assembly 230 may be easily adapted for use with the vehicle 20 illustrated in FIG. 6b.

The reader will appreciate the versatility, interchangeability and intermix-ability of the above attachment and adaptation devices. Any, all or any combination of the attachment and/or adaptation devices above may be used to outfit a vehicle 20.

Description-devices for vehicle parts

Referring to FIG. 2,4&5a my invention comprises a novel method and means of significantly blocking insects and/or weather from entering vehicle/tent 260 enclosure through gap 266 between downward-opened tailgate 30 and vehicle cargo bed 192. In this manner the floor or sleeping area 270 is also made more comfortable and smooth. These benefits are accomplished through the use of a draft wedge 272 device, which is pushed, by operator, into gap 266. It should be noted that many vehicles have spring extended plunger-like light switches located in gap 226, and wedge 272 can be used to depress and hold said switch (not shown). Wedge 272 is an foam like block, the length of gap 266 and with top face 274 wider than the upper opening of said gap and bottom face 276 narrower than said gap. It is foreseen that wedge 272 might be constructed of any flexible plastic foam, in any color and/or shape which will allow said wedge to be compressed and inserted into gap 266. It is also foreseen that wedge 272 might be constructed of a tubular fabric shell filled with, for example: sand, saw dust, air, plastic foam, batting, stuffing.

Figure 11A:
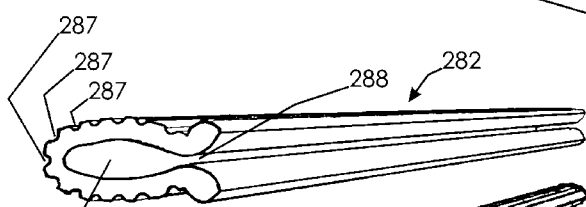
Figure 12A:
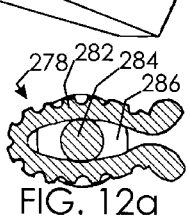
Figure 12B:
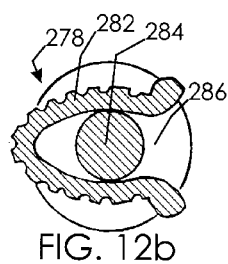
Figure 13:
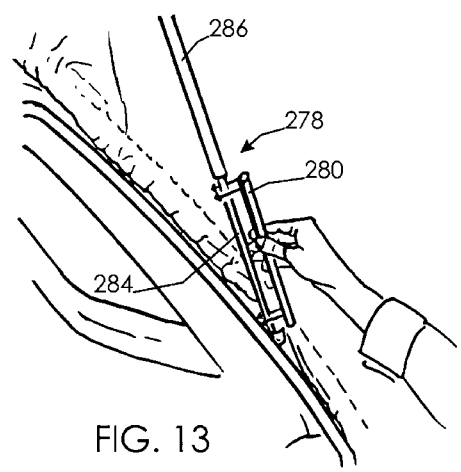

Referring to FIG. 1,2,5a,6a, 7a,11a&b,12 & 13, my invention comprises a novel method and means of supporting a pillion, spring, shock, telescoping tubular device, strut or lift support 278 at a desired opening. This may reduce the wear, prolong the life and increase the utility of a lift support 278. In addition my invention will replace other support devices, such as a broom handle, for hatches, hoods, trunks or lids with old, bad or cold lift support-like devices. Preferred embodiments of a custom support sleeve 280 and a universal support sleeve 282 are illustrated in FIG. 11a & b, both can be molded of flexible plastic and cut to a desired length. Both custom support sleeve 280 and universal support sleeve 282 have an internal dimension determined in relation to the external dimension of lift support shaft 284, and a internal mouth dimension less than said dimension of said shaft, and an external dimension greater than the external dimension of lift support sleeve 286 when on said shaft. Both support sleeves 280 and 282 have grooves 287 which allow for an increased wall thickness of said sleeve without a proportional increase in flex resistance, and offer a better grip for the operator of said sleeve. Universal support sleeve 282 will work with most lift supports used on common vehicles today. Mouth 288 will easily accept shaft 284. Mouth 288 guides shaft 284 into said sleeves cavity 189, while providing an efficient angle of contact between said shaft and said sleeve, said angle turns forward force applied to said sleeve into outward force on said mouth, this allows said sleeve to open, over a variety of sized shafts, more easily. The larger the diameter of shaft 284 the wider mouth 288 will be when attached to said shaft, see FIG. 12b. A larger diameter shaft 284 usually accompanies a larger diameter sleeve 286 and it is important for any support sleeve to come in contact with the outer edge of sleeve 286, to prevent damaging lift support 278 through pushing sleeve 286 seals, gaskets and/or washers out of position. Universal support sleeve 282 provides the appropriate three or four points of contact with the outer edge of sleeve 286 on most vehicle struts. FIG. 12a illustrates how universal support sleeve 282 works when attached to a lift support 278 which is smaller than most lift supports commonly used today. FIG. 12b illustrates how universal support sleeve 282 works when attached to a lift support 278 which is larger than most lift supports commonly used today. Please note the important points of contact between universal support sleeve 282 and the outer edge of sleeve 286. Also please notice that the outer edges of mouth 288 are thicker than the other parts of universal support sleeve 282, this offers greater column support along the outer edge of sleeve 286 on a larger lift support 278, where said edges tend to contact said sleeve. A universal support sleeve 282 is attached to a lift support 278 such as by pushing mouth 288 over and around shaft 284 such as illustrated in FIG. 5a, 7a & 13. It is foreseen that custom support sleeve 280 and universal support sleeve 282 can be constructed of a variety of materials, for example: plastic, wood, fiberglass, mettle, and in a variety of profiles, for example: square, oval, triangle, "V", coil, rectangle, "U".

Figure 11B:
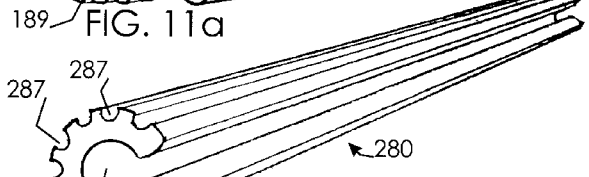
Figure 11C:

Referring to FIG. 11c, my invention also comprises a universal lift support clamp 290. Support clamp 290 can be cut to a desired length and will fit most conventional vehicle lift supports 278. A support clamp 290 includes two opposing jaws, jaw 292 and jaw 294 attached at hinge 296 with spring 297 closing said jaws. Each of said jaws are molded of a rigid plastic and have an opening wing or tab 298 and column beads 300. Support clamp 290 is operated by cutting said clamp to desired length, compressing spring 297, such as by pushing tabs 298a and 298b toward each other, thus opening said support clamp. Support clamp 290 is then placed around strut shaft and released (not shown). It is foreseen that spring 297 and hinge 296 might be eliminated if the jaws are not molded separately, shape in FIG. 17 might be molded as one piece of a flexible plastic, such as HDPE, with or without tabs 298a and 298b. It is also foreseen that the profile of jaws might be modified, with varying results; other desirable profiles are, for example: opposing "v"s, oval, opposing waves (perhaps with decreasing or increasing internal diameters), opposing arches, opposing series of "V"s.

Referring to FIG. 5b, 7c–e & 14, my invention comprises a novel method and means of securing a tent like extension attachment or shell 28 to a vehicle's upward opened rear hatch 32. To do this a securing hook 178, like that in FIG. 14a, is attached, such as by sewing (as in FIG. 14a), to top 34 and hooked around the forward, edge of said opened hatch 32 (as in FIG. 7d) or a wind jam 176 (as in FIG. 5b). Securing hook 178 has a flexible jaw 302 which can accept various sized and shaped edges and wings 303 which can be attached to top 34, such as by being sewn (as in FIG. 14a), slipped into a webbing loop 304 (as in FIG. 14b), inserted into buttonholes 305 (as in FIG. 14c) or worked into a single buttonhole 305 (as in FIG. 14d). The angled forward edge of wings 303 pull the edge of webbing loop 304 or buttonholes 305 inward for a more secure hold. It is anticipated that securing hook 178 can be made of many different materials, for example: plastic, metal, rubber, wood, fibrous composites or a combination.

Referring to FIG. 7a–c,8a & 15a&b, my invention comprises a novel method and means of securing a tent like extension attachment or shell 28 to a vehicle having a rear rain gutter 166. To do this rain gutter clamps 206, like that in FIG. 15a & b, are attached, such as by forcing wire handles 306 toward each other thus opening clamp jaws 308, placing said jaws around rain gutter lip 168 and releasing said handles (not shown). rain gutter clamps 206 are made of spring steel and molded as in FIG. 15a, Wire handles 306 are made of a ridged steel. Cavity 310 allows for additional flexibility of clamp and offers an area where soft materials, tubing and/or rubber seals 311 used to seal a rear opening hatch 32 will not be crushed and damaged. Molded tubes 312 offer a receptacle for the ends of wire handles 306, and tube 314 offers an encircled cavity through which elastic cord 158 may be threaded. It is anticipated that rain gutter clamps 206 can be made of many different materials, for example: plastic, metal, rubber, fibrous composites or a combination of them. It is also anticipated that rain gutter clamps 206 can be made in many different profiles, for example: closed "M", "n", circular, oval or "C". It is also anticipated that rain gutter clamps 206 can be made in many different constructions similar to: close pins, vice grips, "C" clamps or adjustable open end wrenches to name a few. FIG. 15b illustrates how through the use of a simple button hole 305 sewn in forward hem 160, rain gutter clamps 206 may be attached to and operate with forward hem 160. To attach rain gutter clamps 206 to forward hem 160: first open jaws 308 as described above. Next, insert the jaw having tube 314 on it, through button hole 305 and to the bottom of forward hem 160, as in FIG. 15b. Release wire handles 306. Finally, thread the end of elastic cord 158 through tube 314 completing forward hem 160 as described above. To operate rain gutter clamps 206 when attached to forward hem 160 force wire handles 306 toward each other thus opening clamp jaws 308, placing jaws 308 around rain gutter lip 168 and release said handles, see FIG. 15b.

Description-accessories

Figure 16:
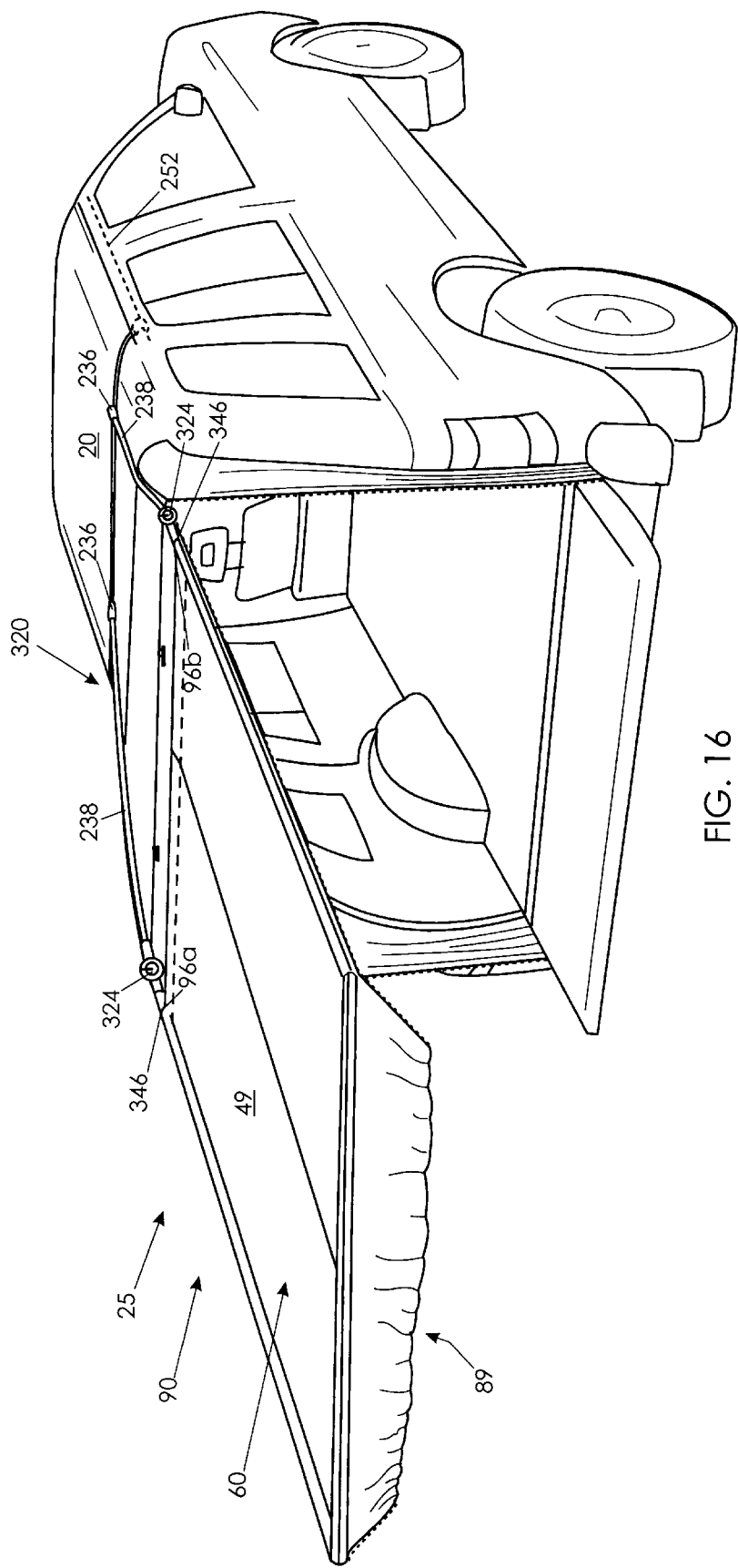
Figures 17A, 17B:
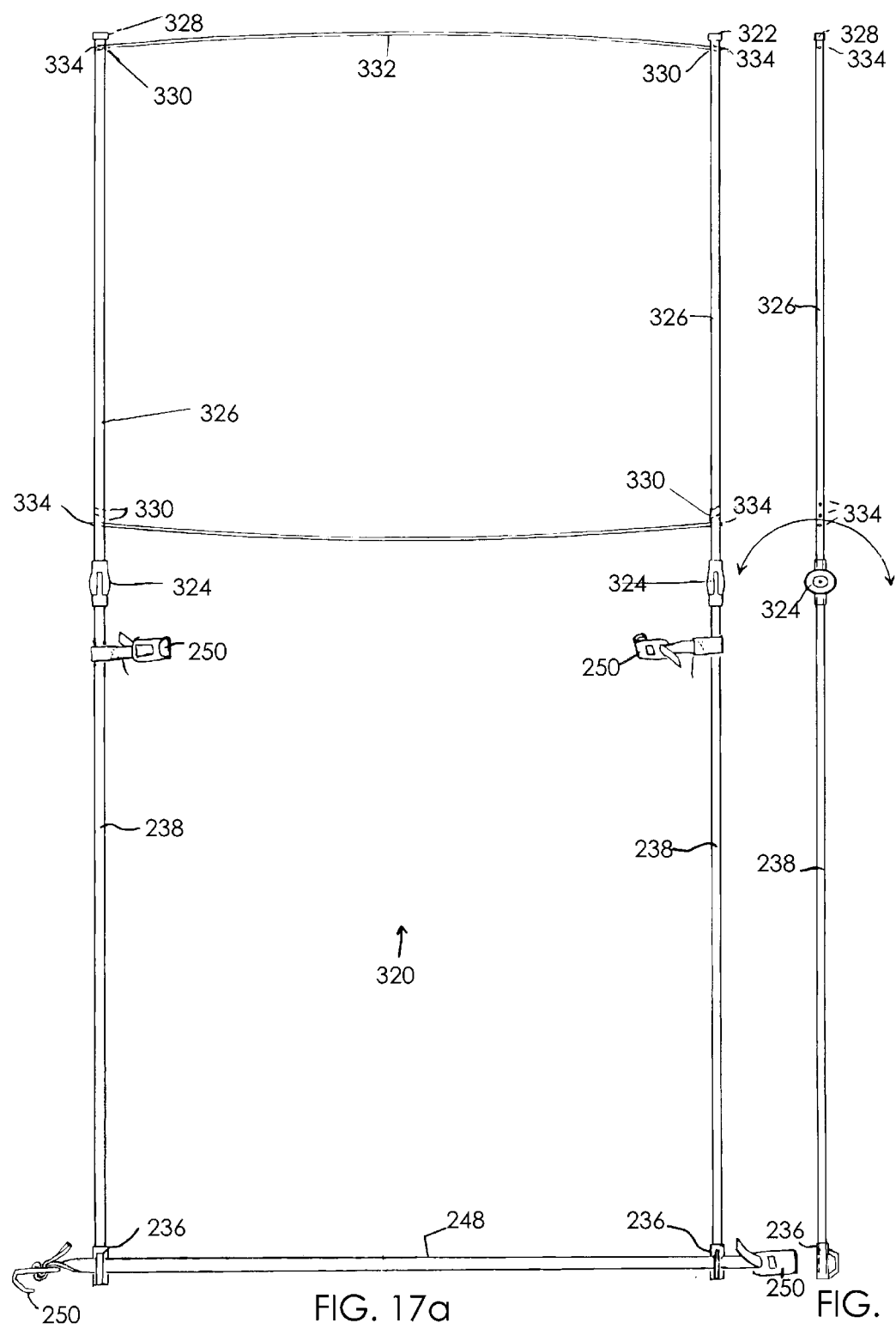

Referring to FIG. 1 and FIG. 17a & 17b, my invention comprises a novel method and means of providing a rain/sun fly 25 attachable to any vehicle 20 having side door rain gutters 252a&b, without poles or ropes encumbering protected area. Rain/sun fly 25 comprises a fly pole assembly 320 partially encased by a fabric independent canopy 322 (as in FIG. 1) or rear panel 49 (as in FIG. 16). Fly pole assembly 320 is generally constructed of tubular aluminum but can be made of other materials and/or profiles, for example: wood, plastic, other (metals) or fiberglass and in, for example: square, oval, rectangular, "I", "n" or "U" profiles, and can break down for storage. Pole assembly 320 includes support poles 238 having slotted end caps 236 and incremental adjustable plastic elbow devices 324 attached, such as by stretching said end caps and devices over end of said poles, as in FIG. 17b. Elbow devices 324 are single axis friction devices commonly used in vehicle rear bicycle racks to adjust bicycle angles for different vehicles, and table umbrellas to change the angle of the upper length of an upper pole, so as to adjust the umbrellas shadow. Elbow devices 324 are stretched over the end of extension poles 326, and end caps 328 are stretched over the other end of extension pole 326, as in FIG. 17b. Angled holes 330 are made, such as by drilling, in extension poles 326 at angles and points similar to those illustrated in FIG. 17a & b. Flexible spring-like cross poles 332, having connection tongues 334 inserted in ends of said poles, are connected, such as by inserting said tongues in angled holes 330, such as illustrated in FIG. 17a. Please note in FIG. 17a cross poles 332 are slightly flexed and arched. This is accomplished through angled holes 330 apposing each other. The angled holes 330 nearest elbow devices 324 angle upward as they exit. The angled holes 330 nearest end caps 328 angle downward as they exit. This forces cross poles 332 apposing arches, as in FIG. 17a. This configuration both binds the structure, holding it together, and gives the rectangular shape some flexibility. If extension poles 326 are forced toward each other, decreasing the "Y" dimension, then cross poles 332 flex more, increasing the "X" dimension. If said force is removed, then tension in cross poles 332 forces structure beak to its original shape. This is helpful because it allows a canopy to be held under constant tension. It is anticipated that the pair of holes that constitute a angled hole 330 in a tubular pole may be shaped differently. For example (not shown), the hole through which connection tongue 334 first enters, the hole facing inward, may be round while the hole facing outward may be oval. This would allow the outer end of connection tongue 334 to move within said oval. This will allow cross poles 332 to have a greater range of flexibility. Outer, inner or both holes may be oval or elongated with similar results, as long as cross poles 332 flex is started and controlled by angled holes 330. It should also be noted that a set of angled holes 330 are made in extension poles 326 near elbow devices 324. This allows the lower cross pole 332 to be attached to any pair of holes in the said sets, allowing for further "X" dimension adjustment. Length and shape of support poles 238 are generally dictated by the vehicle being outfitted. Support poles 238 are generally long enough for the forward end of said poles to be across from vehicle side door rain gutters 252 and provide adequate leverage. Shape of support poles 238 is designed to allow a minimum number of contact points, such as allowing only elbow devices 324 and slotted end caps 236, with vehicle 20. Securing strap 248 is threaded through both slotted end caps 236 with ends of said strap hanging beyond side door rain gutters 252. Each end of securing strap 248 is threaded through holes or slots in door rain gutter hooks 250 to allow for tension adjustment, as in FIG. 17a. It is foreseen that elbow devices 324 are not necessary for the operations of rain/sun fly 25, said devices are included for the convenience of said rain/sun fly operator. It is also foreseen that a vehicle luggage rack can replace securing strap 248 and door rain gutter hooks 250, if support poles 238 are hooked under (or attached to) said rack, not shown. It is anticipated that slotted end caps 236 can be made of many different materials: plastic, metal, rubber, wood, fibrous composites or a combination.

Referring to FIG. 1 & 17a–b, an independent canopy 322 and its attachment to fly pole assembly 320 and vehicle 20 are described. Independent canopy 322 comprises panels of fabric 336a & b which are attached, such as by sewing, to each-other such as allowing seams 338a,b&c, as in FIG. 1. Along the inward side of the open edge of fabric panel 336a is attached, such as by sewing, a VELCRO-like hook strip 340 of fabric. Along the outward side of the open edge of fabric panel 336b is attached, such as by sewing, a VELCRO-like loop strip 342 of fabric. Independent canopy 322 is pulled over and around the end of fly pole assembly 320 and using hook strip 340 and loop strip 342 closed, like in FIG. 1. Please note that for the embodiment of FIG. 1, securing strap 248 and its accompanying door rain gutter hooks 250 are attached to the far side door rain gutter 252a, and additional loop straps 344 are attached, such as by looping and sewing (as in FIG. 17b), to support poles 238 and near side door rain gutter 252b. This arrangement keeps wind from lifting rain/sun fly 25 upward. This configuration also allows rain/sun fly 25 to be adapted to extended off any side of vehicle 20.

Referring to FIG. 16 & 17a–b, attachment of fly pole assembly 320 to rear panel 49 with "I" tent door configuration 60 is described. First, extension poles 326 are threaded, end caps 328 first, through zipper openings 346 and between outer door configuration 90 and screen door configuration 89, said openings occurring when zipper slides 96a and 96b are run toward each other. Screen door configuration 89 is closed, such as by conventional use of zippers used in said configuration. Extension poles 326 are oriented so that inward side of angled holes 330 are facing inward. Cross poles 332 are then attached to fly pole assembly 320 as in FIG. 17a. Outer door configuration 90 is then closed, such as by conventional use of zippers used in said configuration. It is foreseen that securing strap 248 can be replaced by: rope, ribbon, elastic cord, and that the tension adjusting slots in door rain gutter hooks 250 can be replaced by plastic or metal tension adjusting devices attached to securing strap 248. It is also foreseen that rain/sun fly 25 can be adapted to attach to any vehicle and/or conventional tent, with or without an "I" tent door configuration 60 independent of a tail gate tent 22.

Referring to FIG. 18 and FIG. 19a & 19b, my invention comprises a novel method and means of covering vehicle side windows 348a and 348b. In this manner, greater vehicle ventilation and/or interior privacy, can be had, with a minimum of insect and/or weather related problems. My invention includes a magnetic hem 350, attached, such as by being sewn, to a panel 352, such as at seam 354. In a preferred embodiment, panel 352 is comprised of mosquito repellent netting or screening panel 356 which is attached, such as by being sewn, to weather repellent fabric or rain panel 358, such as along seam 360. With window screen 24a attached to vehicle 20, such as illustrated in FIG. 18, screen panel 356 allows ventilation and blocks insects, with rain panel 358 preventing vertical rain from entering vehicle, see FIG. 19a. It is foreseen that a rain gutter or visor 362 might be constructed in the upper portions of magnetic hem 350 which extends generally horizontally a distance from said portions of hem to provide protection from rain see FIG. 19b. FIG. 18 illustrates a placement of magnets 363 within magnetic hem 350. Between magnets 363 can be pockets of plastic foam or beads, batting and/or filling 364 secured in place such as by being sewn or glued. Magnets 363 and fillings 364 are encased in a non slip, soft and thermal stable fabric 366, such as one sided neoprene, which is affixed, such as by being sewn, to the edges of panel 352, such as along seam 354 see FIG. 19a. Window screen 24a has a magnetic hem 350 which encircles side window 348a without any significant overhang of door edge 368. This allows door 370 to be operated normally with window screen 24a attached. The similarity of both faces of a window screen 24a allows said window screen to be positioned over back seat windows on either side of vehicle 20. It is foreseen that magnetic hem 350 might be replaced with magnetic tapes, ribbons, strips, extrusions, injection moldings, plastics and/ or other magnetic device. It is also foreseen that a more universal window screen might be accomplished through the use of a stretchable magnetic hem and screen (such as the nylon material used in women stockings or "nylones") not shown.

It is anticipated that some or all areas of contact between tailgate tent 22 and vehicle 20 may be covered with soft, padding, slip and scratch resistant fabric. This is accomplished such as by sewing segments of said soft fabric over or around said areas of contact. It is also anticipated that any or all poles used in my invention may be made of other materials, for example: steel, fiberglass, wood and plastic; and may be constructed using different profiles, for example: oval, circular, square, rectangular and "I"; and may be telescoping or detachable set poles to offer smaller storage, fitting variability, size variability and manufacturing variability. It is foreseen that all elastic cords used in my invention may be replaced by, for example: rope, string, cord, ribbon or webbing, and coupled with tension or synching devices. It is foreseen that forward hem 160 may be replaced by or used with, for example: inflatable tubing, expanding tubing, magnetic hem, adhesive hem, elastic hem and/or suction cup hemming. It is anticipated that any or all of the zippers used in my invention may be replaced by, for example: buttons, snaps, hooks, adhesive strips, magnetic strips and/or VELCRO-like strip closure systems. It is also anticipated that any or all panels, ribbons and/or segments of fabric used in my invention may be replaces by, for example: plastic sheets, cotton fabric, nylon fabric, water resistant fabric, porus fabric, screen fabric, any collar fabric, multi colored fabric, printed fabric, plastic film, thin fabric, thick canvas, stretchable fabric, coated fabric and/or leather.

The reader will appreciate the versatility, interact-ability and intermix-ability of my invention. Any, all or any combination of the above may be used to outfit a vehicle 20.

In the forgoing detailed description, preferred embodiments of my invention have been described in detail. However, it is understood that although specific embodiments have been described, my invention is capable of numerous rearrangements, modifications and substitutions of parts without departing from the spirit of my invention.

From the description above a number of advantages of my invention become evident:

From the description above a number of general advantages of my invention become evident:

a. My invention increases the utility and versatility of the vehicle or tent it is used with, by providing comfortable and convenient sleeping, working and lounging areas in and/or near said vehicle or tent.

b. No part of my invention requires a permanent modification of a vehicle. All parts of my invention are completely detachable from a vehicle.

c. My invention and its parts are relatively inexpensive to produce, convenient and comfortable to use and are aesthetically pleasing.

d. My invention provides and preserves quick and easy access to the vehicle's tailgate, or cargo bed if no tailgate is present, for use as a work space or seat.

e. My invention requires a minimum of materials to inclose and/or support its extension of a vehicle.

f. All areas of contact between a tailgate tent and a vehicle can be lined with soft scratch, rub and/or mar resistant fabric. This will reduce the damage to a vehicle on which a shell is attached.

g. All parts of my invention are wholly and completely supported by the vehicle, tent or apparatus to which it is attached, thus eliminating any additional concern regarding ground conditions.

From the description above, a number of advantages of my "I" tent door configuration become evident:

h. The "I" tent door configuration offers adjustable screened high rear wall ventilation. This is especially helpful for letting moisture out of a tent-like enclosure at night.

i. This tent door configuration offers its operator a full range of screened or unscreened operation. The entire panel can be opened or closed with everything in between.

j. The flaps of this tent door can be operated independent of their partner to offer vertically adjustable shade, ventilation and access features.

k. The "I" tent door configuration allows a pole structure to be inserted and assembled in the space between its outer and inner door panels, at the same time offering structural support for said pole structure, without critically affecting the doors operation.

From the description above, a number of advantages of my pull tie system become evident:

l. A flexible flap or panel can be retracted and held with the use of only one hand and the performance of one action.

m. My pull tie system provides an optional amount of secured retraction and hold for a flexible panel.

From the description above a number of advantages of my novel method and means used to attach a shell to a vehicle, using a downward opening tailgate, when present, become evident:

n. The lower portions of a shell are securely and snugly attached to a vehicle.

o. My oval elastic cord/hem system under a tailgate provides tension across the entire length of said tailgates outer edges. This provides tension for the entire width of rear and side panels. This tension pulls said panels tighter making them look and work much better. This system also allows the rear panel to be quickly and easily disconnected from side panels, at the same time retracting said side panels, without removing shell from vehicle. Of course this system also provides the method and means for quickly and easily reattaching said panels.

p. Many tailgate obstacles can be enveloped in a shell. This will help to protect many breakable tailgate obstacles, and at the same time allow a shell to attach and work around them.

q. My draft wedge provides a method and means of closing, corking or blocking the gap between a cargo bed and a downward opened tailgate. This will keep insects and wind from entering the enclosure through said gap. This will also flatten and smooth the sleeping surface. At the same time this wedge can be used to compress and hold a spring telescoping light switch, when the operator wishes to keep a vehicle's inside light off.

From the description above a number of advantages of my novel method and means used to attach a shell to a vehicle, using a rear rain gutter of said vehicle, when present, become evident:

r. A rear rain gutter itself will channel water away from the cargo bed area, thus my invention need only prevent water from circumventing the rear rain gutter. This means my invention will keep the sleeping area dry without providing a watertight seal between a vehicle and a shell. This advantage reduces the amount of material used and hence reduces the production costs of a tailgate tent.

s. The preceding advantage allows for another great advantage. A seal area, defined by the contact between a vehicle and a forward hem, of my invention affects a minimal and inconspicuous area of the vehicle's paint or finnish. This means that the scratching, rubbing and/or marring which will occur due to the use of such a product is kept to small and inconspicuous areas of the vehicle.

t. A rain gutter lip works as a wind break, keeping wind from pushing under the forward hem and into the enclosure.

u. A rain gutter lip also offers a stabilizing appendage for wind driven waves or ripples along panels. This will reduce the scratching, rubbing and/or marring in the areas subjected to it.

v. A rain gutter lip also offers a guide when attaching a shell to a vehicle.

w. My combination of a forward hem pulled against the vehicle and an immediately adjacent rain gutter lip offers an opposing obstacle course for would be invading insects.

x. My rain gutter clamps provides the method and means of securely attaching a shell to a rain gutter lip. My rain gutter clamps itself is inexpensive, uncomplicated, convenient, easy to use and effective. My rain gutter clamps will not crush the soft edge of a rain gutter lip, while holding firmly to the rain gutter lip and an elastic cord and/or forward hem.

From the description above, a number of advantages of my novel method and means used to attach a shell to a vehicle, using said vehicle's upward opened rear hatch, when present, become evident:

y. The hatch forward corner pockets and/or envelopes provide a secure no slip hold. Said pockets also provide easy and well defined points of attachment when mounting shell on vehicle.

z. The securing hook provide a no slip hold along hatch forward edge. This prevents vertical sagging through the center of shell. This advantage is especially evident when the reader considers the amount of weight the artificial tailgate will hold in said center portions of shell. The prevention of this type of sagging also insures a good seal between forward hem and the rear top of vehicle. Another advantage provided by the securing hooks is its angled wing design. This allows it to be inserted into a webbing loop button hole or a pair of button holes for easy replacement. The angled edge of wings will pull said button hole toward the center of said hook, for a better hold and to prevent the hook from bending and slipping out of the hole. In addition, the soft plastic construction resists scratching the vehicle's paint, allows the clip to be sewn through and offers a predictable and controllable break away strength, helpful in the event that too much weight is applied to the artificial tailgate or rear panel.

aa. The secure forward hem area of the top of the shell, described in the two preceding paragraphs, provide a base from which to encompass a variety of hatch obstacles and determine the basic dimensions of the top for a particular vehicle.

From the description above a number of advantages of my novel method and means used to attach a shell to a vehicle, using an artificial rain gutter or sealing belt become evident:

ab. For vehicles without a rear rain gutter, my invention provides a stable water tight seal as far back on the vehicle as possible. This reduces the material used in manufacturing and reduces the area of contact between a vehicle and a shell.

ac. In addition, the material used in my invention reduces the damage done in said area, resists bending (thus exerting pressure in seal areas) increasing seal effectiveness. The material is also slip resistant, flexible and water proof.

From the description above, a number of advantages of my artificial tailgate become evident:

ad. For vehicles having no downward lowering tailgate, my invention offers a limited weight bearing extension to a cargo bed or sleeping area.

ae. The artificial tailgate attaches to a vehicle quickly and easily.

af. The artificial tailgate can be rolled up and inserted in a small bag for storage and/or travel.

ag. To provide quick, easy and direct access to the cargo bed, the artificial tailgate can be slid aside and bunched out of the way.

ah. The artificial tailgate and its weight bearing front panel can be quickly and easily detached from any side panels and placed on the top of the upward opened hatch or held out as a sun or rain fly. This configuration offers complete access to the rear edge of the cargo bed. Of course, the said sides and tailgate can be quickly and easily reattached.

ai. The slats in my artificial tailgate will bend when weight is put on them, thus communicating to the operator the limited weight bearing nature of the structure.

aj. If too much weight is placed on the artificial tailgate, the easily replaced slats will break, thus preventing damage to the vehicle.

From the description above a number of advantages of my novel method and means used to attach a shell to a vehicle, using an artificial hatch, door mounted pole assembly or roof mounted pole assembly become evident:

ak. For vehicles having no upward opening hatch, my invention provides structural support for the top, sides and/or rear panel (perhaps including an artificial tailgate) of a tailgate tent.

al. My artificial hatches provide secure no scratch or dent attachment to a vehicle.

am. The artificial hatches attach to a vehicle quickly and easily.

an. The artificial hatches can be disassembled, collapsed and inserted in a small bag for storage and/or travel.

ao. My artificial hatches provide adequate water drainage.

ap. My artificial hatches preserve the detachability and versatility of the rear panel.

aq. The door pole assembly provides very strong support for the rear edge of an enclosure.

ar. Rear edge tube provides easy internal attachment to rear edge pole, along almost all of said poles length.

as. The roof pole assembly is adaptable for almost any covered vehicle having side door rain gutters.

From the description above, a number of advantages of my support sleeve become evident:

at. My support sleeve easily attaches to and detaches from a wide variety of telescoping tube-like support devices.

au. The support sleeve offers support for telescoping tube-like support devices and keeps them from closing.

av. My invention can also be used as a safety device when a life or limb is threatened by the unexpected closure of such a tube-like support.

aw. My support sleeve can slowly give way when too much force is applied on it. This provides safety for the rear hatch if by chance or oversight excessive force is applied on it.

ax. My support sleeve is easily and inexpensively manufactured.

ay. My universal and custom support sleeve grooves allow for an increased wall thickness of said sleeve without a proportional increase in flex resistance.

az. My support sleeve grooves also offer a better grip for the operator of said sleeve.

ba. The mouth of my universal support sleeve easily guides and admits the shaft of a lift-support device into the sleeves cavity.

bb. My universal support sleeve mouth also offers important lift support sleeve outer edge column strength.

From the description above, a number of advantages of my sun and rain fly become evident:

bc. My invention offers sun and rain protection for an area adjacent to a vehicle or tent, without poles or ropes in the protected area.

bd. This fly pole assembly can be inserted into an independent canopy envelope or an "I" tent door configuration, at the same time providing tension against interior walls. This allows said canopy or door configuration to be stretched tight, used for structural support and as the sun and rain protecting canopy.

be. The fly pole assembly is collapsible and disassemble to fit in a storage and/or traveling bag.

bf. Only scratch resistant parts of the pole assembly come in contact with a vehicle, to reduce damage to said vehicle.

bg. The pole assembly can remain on a vehicle when not in use or when said canopy is in use as a door configuration. In this configuration the tent door configuration will operate normally.

bh. Vehicle accessories, such as luggage racks and wind jams, do not preclude the use of the pole assembly.

bi. The elbow devices of the pole assembly allows the shade canopy angle to be adjusted, to provide desired results.

bj. My rain/sun fly, with its independent canopy, may be adapted to fit most any vehicle having side door rain gutters.

From the description above, a number of advantages of my side window screens become evident:

bk. My side window screen can be sized and attached over any vehicle window surrounded or mostly surrounded by ferric metal.

bl. Side window screens block insects and vertical rain while providing air flow through the window over which they are attached.

bm. Side window screens partially or fully block light and viewing through the window over which they are attached.

bn. My side window screens can be easily and quickly attached and detached from over a window.

bo. The side window screens are flexible and can be stuffed in a small sack for travel or storage.

bp. Side window screens do not interfere with the normal operation on vehicle windows or doors.

bq. A side window screen can be attached over paired windows on either side of a vehicle.

br. A stretchable side window screen can attach over a variety of sized and shaped windows.

bs. Advantages (p) (r) (t) and (w) allow for needed tolerance in manufacturing specifications.

bt. My invention parts may be mixed and matched to outfit most any vehicle.

OPERATION OF INVENTION

Shell attachment to present vehicle parts

Referring to FIG. 1,5,7d&13, to attach shell 28 to a covered vehicle 20 having an upward-opening hatch 32. First assuming the vehicle 20 and shell 28 are closed, open and swing out swing-out spare tire 372 if present, as in FIG. 1. Then open and raise hatch 32 and attach, by pushing shaft 284 through mouth 288, see FIG. 13, of custom support sleeve 280 if desired. Then position top 34 on hatch 32 making certain that hatch forward corners 177a&b are tucked into forward corner pockets 38a&b, securing hooks 178 are hooked to hatch forward edge 179 (see FIG. 7d) and forward hem 160 is flat and in contact with rear top 172 from corner to corner of hatch forward edge 179 (see FIG. 5).

Referring to FIG. 4,7a,7c&8a, to attach shell 28 to a covered vehicle 20 having a rear rain gutter 31. Pull forward hem 160 flat along the top and sides of rear rain gutter 31 (as in FIG. 8a) attaching rain gutter clamps 206 if present. Pull forward hem 160 flat between rear sides 170a and 170b, if present, and rear rain gutter lip 168, such as illustrated in FIG. 4. If a tailgate 30 is not present attach rain gutter clamps 206 to bottom corners of rear rain gutter 31, as in FIG. 7c, and using hooks 204a&b attach elastic cord 158 ends to vehicle body as in FIG. 7a, or pull elastic cord 158 ends together and attach them to each other as in FIG. 7c.

Referring to FIG. 2,3, to attach shell 28 to a covered vehicle 20 having a downward-opening tailgate 30. After securing forward hem 160 top 34 and side 36 segments to vehicle 20, hook the bottom of forward hem 160 around tailgate forward corners 164a and 164b as in FIG. 3. Open shell 28, such as by running zipper slides 114a and 88a to the left and 114b and 88b to the right and 108b and 80b upward as in FIG. 2. Then carefully open and lower tailgate 30 into shell 28.

Shell attachment to vehicle with absent vehicle Part adaptations

Referring to FIG. 6b,8a,8c,9a,17a, to attach shell 28 and an artificial hatch to a covered vehicle 20 having no upward-opening hatch 32, assuming vehicle 20 and shell 28 are closed, first open swing-out spare tire 372 if present. Then, if present, open and lower tailgate 30 (as in FIG. 6b) and/or vertically opening rear doors, such as similar doors 216 in FIG. 8a. If similar size doors 216 are present, open and attach door pole assembly 218 as in FIG. 8a. Then, open and pull shell 28 over similar sized doors 216 and door pole assembly 218, attaching forward hem 160 to rain gutter lip 168 as in FIG. 8a. Finally, open zipper ribbon 208, step between artificial tailgate 202 halves, as in FIG. 8c, and pull opened rear edge tube 210 around rear edge pole 220, attaching and zipping together disconnecting zipper ribbon 214, as in FIG. 8b. If similar sized doors 216 are not present, then attach roof pole assembly 230 to vehicle 20. This is accomplished by several steps: First, with tent and poles on the ground, thread support poles 238, slotted end-caps 236 first, through pole tubes 232, as in FIG. 9a. Next, threat external rear edge pole 246 through external rear edge tubes 240 and "T" brackets 244 as in FIG. 9a. Then, thread securing strap 248 through slotted end caps 236 and door rain gutter hooks 250 as in FIG. 17a. Next, lift shell 28 and roof pole assembly 230 off the ground and pull shell 28 over doors or tailgate 30 if present, and position tailgate tent 22 as in FIG. 9a. Then, open side doors, if side door rain gutters 252 are located in under door, hook door rain gutter hooks 250 to side door rain gutters 252 and pull securing strap 248 tight. Finally, position cushioning or padding between support poles 238 and vehicle 20 at fulcrums 254.

Referring to FIG. 3,6a,16b&9a, to attach shell 28 to a covered vehicle 20 having no rear rain gutter 31, assuming vehicle 20 and shell 28 are closed, first open swing-out spare tire 372, if present. If an upward-opening hatch 32 is present, as in FIG. 6a, then first, open and raise hatch 32 and attach, by pushing shaft 284 through mouth 288 see FIG. 13, support sleeve 280, if desired. Then, position top 34 on hatch 32, making certain that top forward hem 160 is flat and is pulled against rear side 170 from corner to corner of hatch forward edge 179. Then, bend the portion of sealing belt 180 forward of forward hem 160, up along top 34 and out along sides 36a and 36b. Next, hook securing hooks 178 to hatch forward edge 179, if present. Then, pull forward hem 160 flat down along sides 36. Next, if tailgate 30 is present, as in FIG. 6a&b, attach forward hem 160 to tailgate 30 as described in paragraph 107. Finally, if tailgate 30 is not present as in FIG. 9a, use hooks 204 to secure the ends of elastic cord 158 to vehicle 20. If an upward-opening hatch 32 is not present as in FIG. 6b & 9a, then first, roll down rear window, if present (see FIG. 6b) or open vertically opening rear doors if present, see FIG. 9a. Then position top 34 on rear top 172 making certain that the entire width of sealing belt 180 is in contact with vehicle 20. Next, pull forward hem 160 flat and down vehicle rear sides 170a and 170b keeping sealing belt 180 in full contact with vehicle 20. Then, if tailgate is present as in FIG. 6b, then attach forward hem 160 to closed tailgate 30 as described in paragraph 107. Finally, if tailgate 30 is not present as in FIG. 9a, use hooks 204a&b to secure the ends of elastic cord 158 to vehicle 20.

Referring to FIG. 5,7a–c,8a,9a & 13, to attach shell 28 to a covered vehicle 20 having no downward-opening tailgate 30, assuming the vehicle 20 and shell 28 are closed, open swing-out spare tire 372, if present. If a upward-opening hatch 32 is present as in FIG. 7a–c, then attach shell 28 to hatch 32 as described in paragraph 105. If an upward-opening hatch 32 is not present as in FIG. 8a & 9a, then attach shell 28 to vehicle 20 as described in paragraph 108. If a rear rain gutter 31 is present as in FIG. 7a–c & 8c, then attach shell 28 to hatch 32 as described in paragraph 106. If a rear rain gutter 31 is not present as in FIG. 9a, then attach shell 28 to hatch 32 as described in paragraph 109. Lift the section of the artificial tailgate 202 that extends beyond forward hem 160 onto cargo bed 192 and position as in FIG. 7a. Unzip zipper ribbon 50b, push artificial tailgate 202 aside and operate pull tie 120b to retract side 38b as in FIG. 7b. FIG. 7b shows a common entrance and exit for this embodiment, offering easy access to cargo bed 192. Artificial tailgate 202 is designed to hold at least the weight of the legs of occupants sleeping in vehicle/tent 260.

Shell use

Referring to FIGS. 1 & 2 a panel with both "I" tent door configuration 60 and pull tie 120 can be used in hundreds of arrangements, with 16 zipper pulls, each able to stop in many positions, 8 pull ties, each able to be pulled from both sides and stop in any position, and 2 separating zipper ribbons. It would be impractical to attempt to identify every combination, so I will describe the more common operations.

First, referring to FIG. 2 pull ties 120 are operated from either end of string 130. To pull from the outside edge of a flap, an operator grabs, with his or her hand, pull string 130 at string end 132a at knot 136 and pulls string through eyelet 128a. This action will cause panel 92b and fabric 122 to bunch up against patch 124a. The operator can stop pulling when desired retraction of flap is achieved. If sufficient friction, for achieved retraction, is present between eyelet 126a and string 130, then operator may release said string and go about their business. If desired retraction is very tight and string 130 slips back through eyelet 126a when string tension is released, then tension should be resumed and operators other hand should be used to compress string lock 134 and slide said string lock against said eyelet, then releasing said lock and said string. To pull from the inside edge of a flap, an operator grabs, with his or her hand, string 130 at sting end 132b at knot 136 and pushes, with his/her other hand, flap 92b away from held string, thus forcing said string through eyelet 126b. This action will cause panel 92b and fabric 122 to bunch up against patch 124a. The operator can stop pushing when desired retraction of flap is achieved. If sufficient friction for achieved retraction is present between eyelet 126a and string 130, then operator may release said string and go about his/her business. If desired retraction is very tight and string 130 slips back through eyelet 126b then string 130 is tied in a releasing knot near eyelet 126b or string end 132b is tied to string end 132a such as with a bow knot.

Referring to FIGS. 1 & 2, assuming all zipper ribbons are fully closed, the following are common operations. For a common entrance and/or exit open shell 28, such as by running zipper slides 114a and 88a to the left and 114b and 88b to the right and 108b and 80b upward a desired distance. If operator desires said entrance to remain open, then he or she may use pull tie 120b,d,f&h. For high wall night time ventilation, usually done by operator within enclosure, open shell 28 such as by running zipper slide 80a and 108a downward and 68a and 94a to the left and 68b and 94b to the right a desired distance. If insects are a problem, then close screen flaps 70a and 70b such as by running zipper slides 80a up 68a right and 68b left. For maximum insectless rear panel ventilation, outer flaps 92a and 92b must first be detached, such as by zipper slides 108a and 108b being run to point 78 and zipper ribbon 106a being pulled out of said zipper slides. Next, zipper slides 94a and 114a are run all the way left and zipper slides 94b and 114b are run all the way right. Finally pull tie 120a,b,g&h are pulled and secured.

To detach rear panel 49 from sides 36a and 36b and secure said panel away from tailgate area as in FIG. 6b, first reach under tailgate 30 find and pull zipper slides 54a and 54b and run said slides to corners of tailgate edge 48 as in FIG. 3. Then run zipper slides 54a and 54b to the top of zipper ribbons 50a and 50b and separate hook and loop VELCRO-like hook strip 155 and loop patch 156 as partially depicted in FIG. 1. If vehicle 20 has no tailgate 30, roll rear panel 49 and place it on top 34 as in FIG. 7c. If vehicle 20 has a tailgate 30, then finally roll up rear panel 49 and secure said panel by pulling loop ties 56 around roll and pushing button ties 55 through said loop ties, as in FIG. 6b.

Accessories

To attach fly pole assembly 320 to shell 28 and make rain/sun fly 25, as in FIG. 16, first run zipper slides 96a and 96b toward each other a few inches. Then thread extension poles 326 slotted end caps 236 first, through zipper ribbon openings 346. Push extension poles 326 to the bottom of pocket, formed between outer door configuration 90 and screen door configuration 89, with angled holes 330 facing inward. Then open outer flaps 92a and 92b as described above, and attach cross poles 332, such as by inserting connecting tongues 334 into angled holes 330 as in FIG. 17a. Then close outer flaps 92a&b and open rear side doors 370. Pull support poles 238 down to vehicle top and attach door rain gutter hooks 250 to side door rain gutters 252 and tighten securing strap 248. Close side doors 370 and unzip zipper ribbons 50a&b as described above. Finally grab bottom cross pole 332 and lift rain/sun 25, such as by flexing elbow devices 324, to desired height and angle as in FIG. 16.

To attach fly pole assembly 320 to independent canopy 322 and make rain/sun fly 25, as in FIG. 1 independent canopy 322 is pulled over and around the end of fly pole assembly 320 using VELCRO-like hook strip 340 and loop strip 342 closed, like in FIG. 1. Please note that securing strap 248 and its accompanying door rain gutter hooks 250 are attached to the far side door rain gutter 252, and additional loop straps 344 are attached to support poles 238 and near side door rain gutter 252. This arrangement keeps wind from lifting rain/sun fly 25 upward. This configuration also allows rain/sun fly 25 to be adapted to extended off any side of vehicle 20.

To attach side window screen 24a to vehicle 20 as in FIG. 18, first straighten said window screen 24a, then position, with rain panel 358 up, and place over window 348a, allowing magnets 363 to attach on metal surfaces surrounding said window.

To insert wedge 272 into gap 266, first position said wedge over said gap with face 274 up, as in FIG. 5. Then push wedge 272 into gap 266 to desired depth.

SUMMARY

My invention will increase the utility, comfort, safety and versatility of a vehicle: by increasing the usable enclosure area and ventilating said area through the use of a tailgate tent, by providing a less damaging and more convenient attachment method/mechanism of a tailgate tent, by providing rain and insect resistant side window ventilation and privacy through the use of a magnetic side window screen and by providing support for lift supports.

My invention will also increase the utility, comfort, safety and ease of operation of a conventional tent and/or a vehicle: by providing a more versatile, useful and convenient tent door configuration, by providing quick and easy tent flap pull ties, and by providing rain and sun protection for an area adjacent to a conventional tent and/or vehicle, without poles or ropes in protected area and by providing safety support for rear hatch support tubes.

My invention will also increase the utility, safety and ease of operation of a conventional telescoping tube-like devices: by providing a support sleeve which can block such a device open.

I claim:

1. A detachable enclosure configured for use as an extension for a vehicle having a cargo area adjacent to a rear opening and a rear hatch which opens upwardly at the rear opening, said rear hatch includes two forward corners, which assume a forward position when the rear hatch is opened, and two rearward corners, which assume an aft position when the rear hatch is opened, the detachable enclosure comprising:

a rear panel comprising a flexible material and having a first end and a second end;

a first side panel bordering the first end of the rear panel;

a second side panel bordering the second end of the rear panel;

a top panel positioned above the rear hatch and bordering the first and second side panels; and means of attaching a portion of the top panel to one of the forward corners for keeping said top panel from slipping rearwardly on said rear hatch.

2. A detachable enclosure as defined in claim 1 further comprising means for securing said rear hatch in an open position.

3. A detachable enclosure as defined in claim 1 wherein said means of attaching comprises a segment of material attached to the top panel such that an opening is formed, between said top panel and said segment, such that one of the forward corners fits into said opening.

4. A detachable enclosure as defined in claim 1 wherein the vehicle further comprises a tailgate which opens downwardly at the rear opening and includes two forward corners and two rearward corners, wherein the detachable enclosure includes means for attaching a portion of the detachable enclosure to one of the forward corners of the tailgate.

5. A detachable enclosure as defined in claim 4 further comprising means for biasing the side panels and the rear panel toward the tailgate.

6. A detachable enclosure as defined in claim 1 further comprising a plurality of zipper means for removably attaching said side panels and said rear panel.

7. A detachable enclosure as defined in claim 1 wherein said rear panel includes a doorway structure providing access to and ventilation for the interior of the detachable enclosure, comprising:

a first panel, comprising flexible material, and having four sides, which is attached to said enclosure along a first side;

a second panel, comprising flexible material, and having four sides, which is attached to said enclosure along a first side, said first panel opposing said second panel;

a first zipper means for removably attaching a second side of the first panel to a second side of the second panel, said first zipper means allowing the first and the second panels to be selectively connected and disconnected;

a second zipper means for removably attaching a third side of said first panel to said enclosure;

a third zipper means for removably attaching a third side of said second panel to said enclosure;

a fourth zipper means for removably attaching a fourth side of said first panel to said enclosure; and a fifth zipper means for removably attaching a fourth side of said second panel to said enclosure.

8. A detachable enclosure configured for use as an extension for a vehicle having a cargo area adjacent to a rear opening and a rear hatch which opens upwardly at the rear opening, said rear hatch includes two forward corners and two rearward corners said vehicle further comprising a tailgate which opens downwardly at the rear opening which includes two forward corners and two rearward corners, the detachable enclosure comprising:

a rear panel comprising a flexible material and having a first end and a second end;

a first side panel bordering the first end of the rear panel;

a second side panel bordering the second end of the rear panel;

a top panel bordering the first and second side panels;

means of attaching a portion of the top panel to one of the rear hatch forward corners for keeping said top panel from slipping rearwardly on said rear hatch; and means for attaching a portion of the detachable enclosure to one of the forward corners of the tailgate.

9. A detachable enclosure as defined in claim 8 further comprising means for securing said rear hatch in an open position.

10. A detachable enclosure as defined in claim 8 wherein said means of attaching comprises a segment of material attached to the top panel such that an opening is formed, between said top panel and said segment, such that one of the forward corners fits into said opening.

11. A detachable enclosure as defined in claim 8 further comprising means for biasing the side panels and the rear panel toward the tailgate.

12. A detachable enclosure as defined in claim 8 further comprising a plurality of zipper means for removably attaching said side panels and said rear panel.

13. A detachable enclosure configured for use as an extension for a vehicle having a cargo area adjacent to a rear opening, the rear opening having a top portion and a first side portion and a second side portion, the vehicle having a continuous rear rain gutter channel structure positioned along the top portion of the rear opening and at least partially positioned along the first and second side portions of the rear opening, the vehicle also having a rear hatch which opens upward which includes two forward corners and two rearward corners, the detachable enclosure comprising:

a rear panel comprising a flexible material and having a first end, a second end, and a top end;

a first side panel bordering the first end of the rear panel;

first means for releasably holding at least a portion of the first side panel in the rear rain gutter channel positioned along the first side of the rear opening such that the first side panel is held in position about the rear opening, the first means for holding comprising a first forward hem segment which lays in said vehicle's rear rain gutter channel positioned on the first side of the rear opening;

a second side panel bordering the second end of the rear panel;

second means for releasably holding at least a portion of the second side panel in the rear rain gutter positioned along the second side of the rear opening such that the second side panel is held in position about the rear opening the second means for holding comprising a second forward hem segment which lays in said vehicle's rear rain gutter channel positioned on the second side of the rear opening such that moisture falling on the first and second panels is channeled away from said cargo area;

a top panel bordering the top end of the rear panel;

means for attaching the top panel to one of the forward corners of the rear hatch for keeping said top panel from slipping rearwardly on said rear hatch.

14. A detachable enclosure as defined in claim 13 wherein said vehicle includes a tailgate which opens downwardly which comprises two forward corners and two rearward corners, said enclosure further comprising means for attaching a portion of the detachable enclosure to one of the forward corners of the tailgate.

15. A detachable enclosure as defined in claim 13 wherein said rear panel includes a doorway structure providing access to and ventilation for the interior of the detachable enclosure comprising:

a first panel, comprising flexible material, and having four sides, which is attached to said enclosure along a first side;

a second panel, comprising flexible material, and having four sides, which is attached to said enclosure along a first side, said first panel opposing said second panel;

a first zipper means for removably attaching a second side of the first panel to a second side of the second panel, said first zipper means allowing the first and the second panels to be selectively connected and disconnected;

a second zipper means for removably attaching a third side of said first panel to said enclosure;

a third zipper means for removably attaching a third side of said second panel to said enclosure;

a fourth zipper means for removably attaching a fourth side of said first panel to said enclosure; and a fifth zipper means for removably attaching a fourth side of said second panel to said enclosure.

* * * * *